United States Patent
Sarkar

(10) Patent No.: US 7,660,282 B2
(45) Date of Patent: *Feb. 9, 2010

(54) CONGESTION CONTROL IN A WIRELESS DATA NETWORK

(75) Inventor: Sandip Sarkar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 482 days.

This patent is subject to a terminal disclaimer.

(21) Appl. No.: 10/646,242

(22) Filed: Aug. 22, 2003

(65) Prior Publication Data

US 2004/0160914 A1    Aug. 19, 2004

Related U.S. Application Data

(60) Provisional application No. 60/448,269, filed on Feb. 18, 2003, provisional application No. 60/452,790, filed on Mar. 6, 2003, provisional application No. 60/470,770, filed on May 14, 2003.

(51) Int. Cl.
*H04Q 7/00* (2006.01)

(52) U.S. Cl. .................. 370/331; 370/395.41; 455/454

(58) Field of Classification Search .................. 370/329, 370/340, 229, 230, 230.1, 277, 278, 341, 370/321, 320, 335, 395.41, 441, 331; 455/454
See application file for complete search history.

(56) References Cited

U.S. PATENT DOCUMENTS 5,752,193 A * 5/1998 Scholefield et al. ...... 455/452.2

(Continued)

FOREIGN PATENT DOCUMENTS

CN    1263675    8/2000

(Continued)

OTHER PUBLICATIONS

Chakravarty et al. "An Algorithm for Reverse Traffic Channel Rate Control for cdma2000 High Rate Packet Data Systems", Globecom 2001, San Antonio, Texas, Nov. 2001, pp. 3733-3737.

(Continued)

*Primary Examiner*—Chi H Pham
*Assistant Examiner*—Alexander Boakye
(74) *Attorney, Agent, or Firm*—S. Hossain Beladi; Charles E. Eggers

(57) ABSTRACT

Techniques for congestion control are disclosed. In one embodiment, a base station allocates a shared resource using a combination of zero or more individual grants and zero or more common grants, and generates a busy signal in response to loading conditions that exceed a pre-determined level. In another embodiment, a subset of transmitting mobile stations reduce their transmission rate in response to a busy signal. The subset may include autonomous transmission, commonly granted transmission, individually granted transmission, or any combination thereof. In various embodiments, rate adjustment may be probabilistic or deterministic. In one embodiment, a rate table is deployed, and a mobile station decreases or increases the transmission rate from one rate in the table to a lower or higher rate in the table, respectively, in response to the busy signal. Various other aspects are also presented. These aspects have the benefit of providing efficient congestion control, avoiding excessive interference and increasing capacity.

52 Claims, 10 Drawing Sheets

U.S. PATENT DOCUMENTS

| | | | |
|---|---|---|---|
| 5,754,537 A * | 5/1998 | Jamal | 370/330 |
| 5,857,174 A | 1/1999 | Dugan | |
| 5,914,950 A | 6/1999 | Tiedemann et al. | |
| 5,923,650 A * | 7/1999 | Chen et al. | 370/331 |
| 6,335,922 B1 | 1/2002 | Tiedemann et al. | |
| 6,880,103 B2 * | 4/2005 | Kim et al. | 714/18 |
| 2004/0160933 A1 | 8/2004 | Odenwalder et al. | |
| 2004/0162083 A1 * | 8/2004 | Chen et al. | 455/454 |

FOREIGN PATENT DOCUMENTS

| | | |
|---|---|---|
| EP | 1257140 | 11/2002 |
| WO | 01024568 | 4/2001 |

OTHER PUBLICATIONS

Chung et al. "An Efficient Reverse Link Data Rate Control Scheme for 1xEV-DV System", IEEE 54$^{th}$. Vehicular Technology Conference. Proceedings. Atlantic City, NJ, Oct. 7-11, 2001. IEEE, US, vol. 1 of 4, Conf. 54, Oct. 10, 2001, pp. 820-823.

3GPP2 C. "cdma2000 High Rate Packet Data Air Interference Specification C.S0024" 3GPP Standards, Sep. 12, 2000.

International Search Report - PCT/USO4/004788, Internatioanl Search Authority - European Patent Office - Sep. 24, 2004.

3G TS 25.211 "Physical channels and mapping of transport channels onto physical channels (FDD)", Release 5, V5.0.0, Mar. 2002.

3G TS 25.212 "Multiplexing and channel coding (FDD)" Release 5. V5.0.0, Mar. 2002.

3G TS 25.213 "Spreading and Modulation (FDD)", Release 5, V5.0.0, Mar. 2002.

3G TS 25.214 "Physcal layer procedures (FDD)", Release 5, V5.0.0, Mar. 2002.

International Preliminary Examination Report PCT/US2004/004788, IPEA/US Dec. 22, 2005.

Written Opinion PCT/US2004/004788, International Search Authority European Patent Office Aug. 15, 2005.

* cited by examiner

CONGESTION CONTROL IN A WIRELESS DATA NETWORK

This application is a non-provisional application claiming priority to provisional application Ser. No. 60/448,269, entitled "REVERSE LINK DATA COMMUNICATION", filed on Feb. 18, 2003; U.S. provisional application Ser. No. 60/452,790, entitled "METHOD AND APPARATUS FOR A REVERSE LINK COMMUNICATION IN A COMMUNICATION SYSTEM", filed on Mar. 6, 2003; and U.S. provisional application Ser. No. 60/470,770, entitled "OUTER-LOOP POWER CONTROL FOR REL. D", filed on May 14, 2003.

FIELD

The present invention relates generally to wireless communications, and more specifically to a novel and improved method and apparatus for congestion control in a wireless data network.

BACKGROUND

Wireless communication systems are widely deployed to provide various types of communication such as voice and data. These systems may be based on code division multiple access (CDMA), time division multiple access (TDMA), or some other multiple access techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) some other standards.

In the above named standards, the available spectrum is shared simultaneously among a number of users, and techniques such as power control and soft handoff are employed to maintain sufficient quality to support delay-sensitive services, such as voice. Data services are also available. More recently, systems have been proposed that enhance the capacity for data services by using higher order modulation, very fast feedback of Carrier to Interference ratio (C/I) from the mobile station, very fast scheduling, and scheduling for services that have more relaxed delay requirements. An example of such a data-only communication system using these techniques is the high data rate (HDR) system that conforms to the TI/EIA/IS-856 standard (the IS-856 standard).

In contrast to the other above named standards, an IS-856 system uses the entire spectrum available in each cell to transmit data to a single user at one time, selected based on link quality. In so doing, the system spends a greater percentage of time sending data at higher rates when the channel is good, and thereby reduces committing resources to support transmission at inefficient rates. The net effect is higher data capacity, higher peak data rates, and higher average system throughput.

Systems can incorporate support for delay-sensitive data, such as voice channels or data channels supported in the IS-2000 standard, along with support for packet data services such as those described in the IS-856 standard. The cdma2000® Revision C of the IS-2000 standard(including C.S0001.C through C.S0006.C) is such a system, and is hereinafter referred to as the 1xEV-DV system. In the rest of the document, we'll refer to release 0, A, and B of the cdma2000® standard as cdma2000, while revision C and upwards will be referred to as 1xEV-DV systems.

An example 1xEV-DV system includes a reverse link control mechanism for allocating the shared reverse link resource for transmission by a plurality of mobile stations. A mobile station may make a request to a serving base station for transmission permission with a maximum rate supportable by the mobile station. Alternatively, a mobile station is allowed to transmit autonomously, without making a request, at a rate up to a determined autonomous maximum rate. The serving base station anticipates an expected amount of autonomous transmission on the reverse link, reviews any requests made by mobile stations, and allocates the shared resource accordingly. The base station may elect to make one or more individual grants to requesting mobile stations, and includes the maximum rate for those grants. The remaining requesting mobile stations may be issued permission to transmit according to a common grant, with an associated maximum transmission rate. Thus, the serving base station attempts to maximize utilization of the shared resource with a combination of individual and common grants, in the presence of autonomous transmission by other mobile stations. Various techniques may be used to allow mobile stations to continue transmitting according to a determined allocation and the associated grants, with a minimum amount of signaling required.

From time to time, the amount of loading on the reverse link may exceed the amount predicted by the serving base station. Various factors may lead to this system over-utilization, an example of which is the uncertainty in the actual number of autonomous transmissions that may transpire. Overall throughput, and thus effective capacity of the system, may deteriorate when the system becomes congested. For example, a resultant increase in error rate may result in loss of successful data transmission, and subsequent retransmission will use additional capacity on the shared resource. While the allocation and granting procedure just described may be used to alleviate overloading on the system, there is latency associated with the messaging required. Capacity and throughput may be adversely affected during this time. It is desirable to be able to reduce the system loading quickly to minimize these adverse effects.

Furthermore, additional messaging also uses system capacity. In some circumstances, the system overload is a temporal condition, after which, the previous allocation and associated grants will be appropriate for the desired system load. It is desirable for the various mobile stations to return to the prescribed allocation while minimizing messaging overhead. There is therefore a need in the art for congestion control to reduce system loading efficiently.

SUMMARY

Embodiments disclosed herein address the need for congestion control. In one embodiment, a base station allocates a shared resource using a combination of zero or more individual grants and zero or more common grants, and generates a busy signal in response to loading conditions that exceed a pre-determined level. In another embodiment, a subset of transmitting mobile stations reduce their transmission rate in response to a busy signal. In one embodiment, autonomously transmitting mobile stations adjust transmission rates in response to a busy signal. In another embodiment, commonly granted mobile stations adjust transmission rates in response to a busy signal. In yet another embodiment, individually granted mobile stations adjust transmission rates in response to a busy signal. In various embodiments, rate adjustment may be probabilistic or deterministic. In one embodiment, a rate table is deployed, and a mobile station decreases or increases the transmission rate from one rate in the table to a lower or higher rate in the table, respectively, in response to the busy signal. Various other aspects are also presented. These aspects have the benefit of providing efficient utilization of the reverse link capacity, accommodating varying requirements such as low-latency, high throughput or differing quality of service, and reducing forward and reverse link overhead for providing these benefits, thus avoiding excessive interference and increasing capacity.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
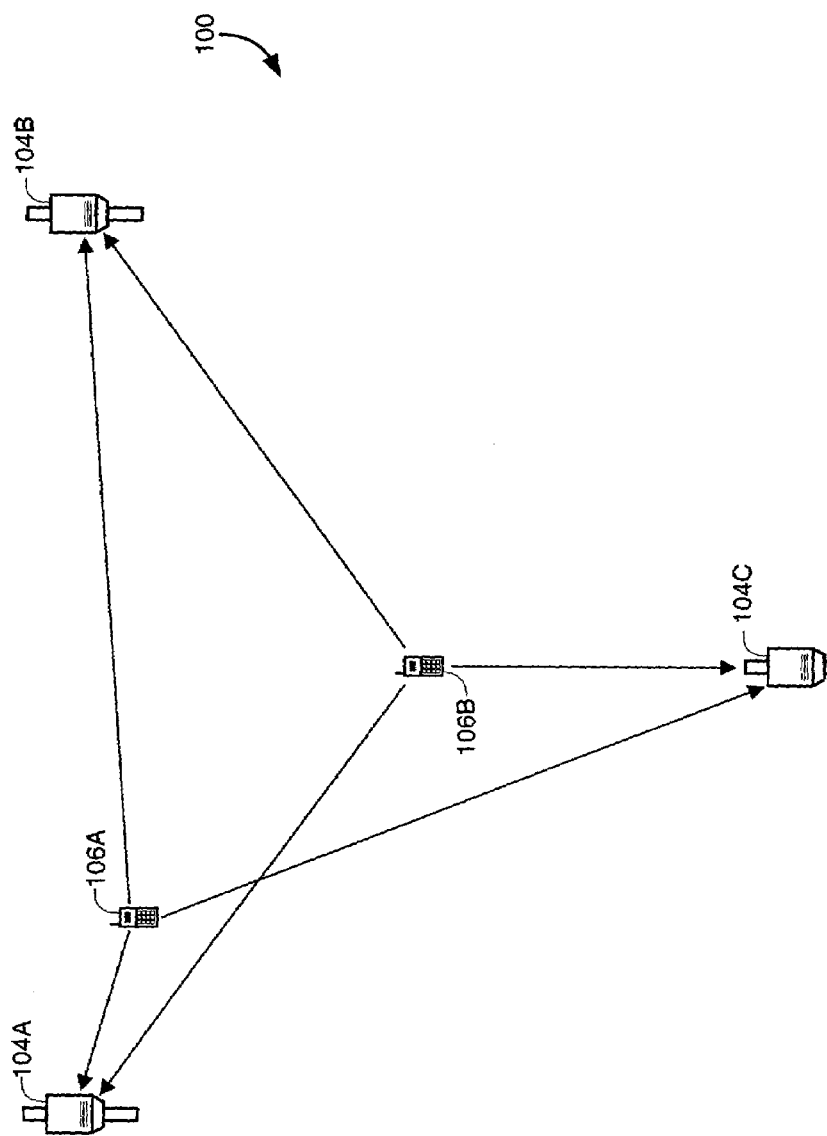
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification, the 1xEV-DV system). In an alternative embodiment, system 100 may additionally support any wireless standard or design other than a CDMA system. In the exemplary embodiment, system 100 is a 1xEV-DV system.

For simplicity, system 100 is shown to include three base stations 104 in communication with two mobile stations 106. The base station and its coverage area are often collectively referred to as a "cell". In IS-95, cdma2000, or 1xEV-DV systems, for example, a cell may include one or more sectors. In the W-CDMA specification, each sector of a base station and the sector's coverage area is referred to as a cell. As used herein, the term base station can be used interchangeably with the terms access point or Node B. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

While the various embodiments described herein are directed to providing reverse-link or forward-link signals for supporting reverse link transmission, and some may be well suited to the nature of reverse link transmission, those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

1xEV-DV Forward Link Data Transmission and Reverse Link Power Control

A system 100, such as the one described in the 1xEV-DV proposal, generally comprises forward link channels of four classes: overhead channels, dynamically varying IS-95 and IS-2000 channels, a Forward Packet Data Channel (F-PDCH), and some spare channels. The overhead channel assignments vary slowly; for example, they may not change for months. They are typically changed when there are major network configuration changes. The dynamically varying IS-95 and IS-2000 channels are allocated on a per call basis or are used for IS-95, or IS-2000 Release 0 through B packet services. Typically, the available base station power remaining after the overhead channels and dynamically varying channels have been assigned is allocated to the F-PDCH for remaining data services. The F-PDCH may be used for data services that are less sensitive to delay while the IS-2000 channels are used for more delay-sensitive services.

The F-PDCH, similar to the traffic channel in the IS-856 standard, is used to send data at the highest supportable data rate to one user in each cell at a time. In IS-856, the entire power of the base station and the entire space of Walsh functions are available when transmitting data to a mobile station. However, in the proposed 1xEV-DV system, some base station power and some of the Walsh functions are allocated to overhead channels and existing IS-95 and cdma2000 services. The data rate that is supportable depends primarily upon the available power and Walsh codes after the power and Walsh codes for the overhead, IS-95, and IS-2000 channels have been assigned. The data transmitted on the F-PDCH is spread using one or more Walsh codes.

In the 1xEV-DV system, the base station generally transmits to one mobile station on the F-PDCH at a time, although many users may be using packet services in a cell. (It is also possible to transmit to two users by scheduling transmissions for the two users, and allocating power and Walsh channels to each user appropriately.) Mobile stations are selected for forward link transmission based upon some scheduling algorithm.

In a system similar to IS-856 or 1xEV-DV, scheduling is based in part on channel quality feedback from the mobile stations being serviced. For example, in IS-856, mobile stations estimate the quality of the forward link and compute a transmission rate expected to be sustainable for the current conditions. The desired rate from each mobile station is transmitted to the base station. The scheduling algorithm may, for example, select a mobile station for transmission that supports a relatively higher transmission rate in order to make more efficient use of the shared communication channel. As another example, in a 1xEV-DV system, each mobile station transmits a Carrier-to-Interference (C/I) estimate as the channel quality estimate on the Reverse Channel Quality Indicator Channel (R-CQICH). The scheduling algorithm is used to determine the mobile station selected for transmission, as well as the appropriate rate and transmission format in accordance with the channel quality.

As described above, a wireless communication system 100 may support multiple users sharing the communication resource simultaneously, such as an IS-95 system, may allocate the entire communication resource to one user at time, such as an IS-856 system, or may apportion the communication resource to allow both types of access. A 1xEV-DV system is an example of a system that divides the communication resource between both types of access, and dynamically allocates the apportionment according to user demand. Following is a brief background on how the communication resource can be allocated to accommodate various users in both types of access systems. Power control is described for simultaneous access by multiple users, such as IS-95 type channels. Rate determination and scheduling is discussed for time-shared access by multiple users, such as an IS-856 system or the data-only portion of a 1xEV-DV type system (i.e., the F-PDCH).

Capacity in a system such as an IS-95 CDMA system is determined in part by interference generated in transmitting signals to and from various users within the system. A feature of a typical CDMA system is to encode and modulate signals for transmission to or from a mobile station such that the signals are seen as interference by other mobile stations. For example, on the forward link, the quality of the channel between a base station and one mobile station is determined in part by other user interference. To maintain a desired performance level of communication with the mobile station, the transmit power dedicated to that mobile station must be sufficient to overcome the power transmitted to the other mobile stations served by the base station, as well as other disturbances and degradation experienced in that channel. Thus, to increase capacity, it is desirable to transmit the minimum power required to each mobile station served.

In a typical CDMA system, when multiple mobile stations are transmitting to a base station, it is desirable to receive a plurality of mobile station signals at the base station at a normalized power level. Thus, for example, a reverse link power control system may regulate the transmit power from each mobile station such that signals from nearby mobile stations do not overpower signals from farther away mobile stations. As with the forward link, keeping the transmit power of each mobile station at the minimum power level required to maintain the desired performance level allows for capacity to be optimized, in addition to other benefits of power savings such as increased talk and standby times, reduced battery requirements, and the like.

Capacity in a typical CDMA system, such as IS-95, is constrained by, among other things, other-user interference. Other-user interference can be mitigated through use of power control. The overall performance of the system, including capacity, voice quality, data transmission rates and throughput, is dependent upon stations transmitting at the lowest power level to sustain the desired level of performance whenever possible. To accomplish this, various power control techniques are known in the art.

One class of techniques includes closed loop power control. For example, closed loop power control may be deployed on the forward link. Such systems may employ an inner and outer power control loop in the mobile station. An outer loop determines a target received power level according to a desired received error rate. For example, a target frame error rate of 1% may be pre-determined as the desired error rate. The outer loop may update the target received power level at a relatively slow rate, such as once per frame or block. In response, the inner loop then sends up or down power control messages to the base station until received power meets the target. These inner loop power control commands occur relatively frequently, so as to quickly adapt the transmitted power to the level necessary to achieve the desired received signal to noise and interference ratio for efficient communication. As described above, keeping the forward link transmit power for each mobile station at the lowest level reduces other user interference seen at each mobile station and allows remaining available transmit power to be reserved for other purposes. In a system such as IS-95, the remaining available transmit power can be used to support communication with additional users. In a system such as 1xEV-DV, the remaining available transmit power can be used to support additional users, or to increase the throughput of the data-only portion of the system.

In a "data-only" system, such as IS-856, or in the "data-only" portion of a system, such as 1xEV-DV, a control loop may be deployed to govern the transmission from the base station to a mobile station in a time-shared manner. For clarity, in the following discussion, transmission to one mobile station at a time may be described. This is to distinguish from a simultaneous access system, an example of which is IS-95, or various channels in a cdma200 or 1xEV-DV system. Two notes are in order at this point.

First, the term "data-only" or "data channel" may be used to distinguish a channel from IS-95 type voice or data channels (i.e. simultaneous access channels using power control, as described above) for clarity of discussion only. It will be apparent to those of skill in the art that data-only or data channels described herein can be used to transmit data of any type, including voice (e.g., voice over Internet Protocol, or VOIP). The usefulness of any particular embodiment for a particular type of data may be determined in part by the throughput requirements, latency requirements, and the like. Those of skill in the art will readily adapt various embodiments, combining either access type with parameters selected to provide the desired levels of latency, throughput, quality of service, and the like.

Second, a data-only portion of a system, such as that described for 1xEV-DV, which is described as time-sharing the communication resource, can be adapted to provide access on the forward link to more than one user simultaneously. In examples herein where the communication resource is described as time-shared to provide communication with one mobile station or user during a certain period, those of skill in the art will readily adapt those examples to allow for time-shared transmission to or from more than one mobile station or user within that time period.

A typical data communication system may include one or more channels of various types. More specifically, one or more data channels are commonly deployed. It is also common for one or more control channels to be deployed, although in-band control signaling can be included on a data channel. For example, in a 1xEV-DV system, a Forward Packet Data Control Channel (F-PDCCH) and a Forward Packet Data Channel (F-PDCH) are defined for transmission of control and data, respectively, on the forward link.

Figure 2:
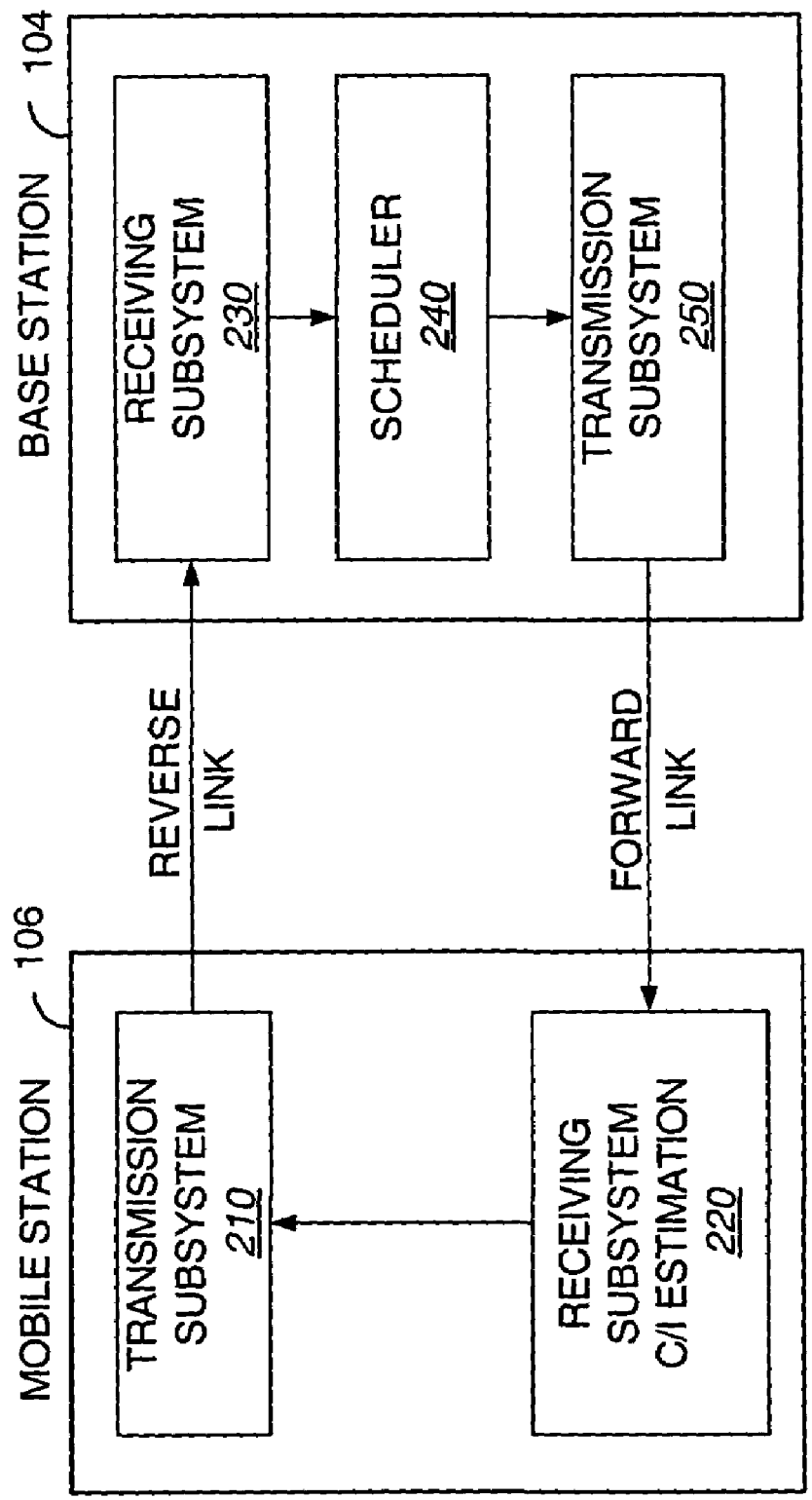
FIG. 2 depicts an example mobile station and base station configured in a system adapted for data communication.

FIG. 2 depicts an example mobile station 106 and base station 104 configured in a system 100 adapted for data communication. Base station 104 and mobile station 106 are shown communicating on a forward and a reverse link. Mobile station 106 receives forward link signals in receiving subsystem 220. A base station 104 communicating the forward data and control channels, detailed below, may be referred to herein as the serving station for the mobile station 106. An example receiving subsystem is detailed further below with respect to FIG. 3. A Carrier-to-Interference (C/I) estimate is made for the forward link signal received from the serving base station in the mobile station 106. A C/I measurement is an example of a channel quality metric used as a channel estimate, and alternate channel quality metrics can be deployed in alternate embodiments. The C/I measurement is delivered to transmission subsystem 210 in the base station 104, an example of which is detailed further below with respect to FIG. 3.

The transmission subsystem 210 delivers the C/I estimate over the reverse link where it is delivered to the serving base station. Note that, in a soft handoff situation, well known in the art, the reverse link signals transmitted from a mobile station may be received by one or more base stations other than the serving base station, referred to herein as non-serving base stations. Receiving subsystem 230, in base station 104, receives the C/I information from mobile station 106.

Scheduler 240, in base station 104, is used to determine whether and how data should be transmitted to one or more mobile stations within the serving cell's coverage area. Any type of scheduling algorithm can be deployed within the scope of the present invention. One example is disclosed in U.S. patent application Ser. No. 08/798,951, entitled "METHOD AND APPARATUS FOR FORWARD LINK RATE SCHEDULING", filed Feb. 11, 1997, assigned to the assignee of the present invention.

In an example 1xEV-DV embodiment, a mobile station is selected for forward link transmission when the C/I measurement received from that mobile station indicates that data can be transmitted at a certain rate. It is advantageous, in terms of system capacity, to select a target mobile station such that the shared communication resource is always utilized at its maximum supportable rate. Thus, the typical target mobile station selected may be the one with the greatest reported C/I. Other factors may also be incorporated in a scheduling decision. For example, minimum quality of service guarantees may have been made to various users. It may be that a mobile station, with a relatively lower reported C/I, is selected for transmission to maintain a minimum data transfer rate to that user.

In the example 1xEV-DV system, scheduler 240 determines which mobile station to transmit to, and also the data rate, modulation format, and power level for that transmission. In an alternate embodiment, such as an IS-856 system, for example, a supportable rate/modulation format decision can be made at the mobile station, based on channel quality measured at the mobile station, and the transmit format can be transmitted to the serving base station in lieu of the C/I measurement. Those of skill in the art will recognize myriad combinations of supportable rates, modulation formats, power levels, and the like which can be deployed within the scope of the present invention. Furthermore, although in various embodiments described herein the scheduling tasks are performed in the base station, in alternate embodiments, some or all of the scheduling process may take place in the mobile station.

Scheduler 240 directs transmission subsystem 250 to transmit to the selected mobile station on the forward link using the selected rate, modulation format, power level, and the like.

In the example embodiment, messages on the control channel, or F-PDCCH, are transmitted along with data on the data channel, or F-PDCH. The control channel can be used to identify the recipient mobile station of the data on the F-PDCH, as well as identifying other communication parameters useful during the communication session. A mobile station should receive and demodulate data from the F-PDCH when the F-PDCCH indicates that mobile station is the target of the transmission. The mobile station responds on the reverse link following the receipt of such data with a message indicating the success or failure of the transmission. Retransmission techniques, well known in the art, are commonly deployed in data communication systems.

A mobile station may be in communication with more than one base station, a condition known as soft handoff. Soft handoff may include multiple sectors from one base station (or one Base Transceiver Subsystem (BTS)), known as softer handoff, as well as with sectors from multiple BTSs. Base station sectors in soft handoff are generally stored in a mobile station's Active Set. In a simultaneously shared communication resource system, such as IS-95, IS-2000, or the corresponding portion of a 1xEV-DV system, the mobile station may combine forward link signals transmitted from all the sectors in the Active Set. In a data-only system, such as IS-856, or the corresponding portion of a 1xEV-DV system, a mobile station receives a forward link data signal from one base station in the Active Set, the serving base station (determined according to a mobile station selection algorithm, such as those described in the C.S0002.C standard). Other forward link signals, examples of which are detailed further below, may also be received from non-serving base stations.

Reverse link signals from the mobile station may be received at multiple base stations, and the quality of the reverse link is generally maintained for the base stations in the active set. It is possible for reverse link signals received at multiple base stations to be combined. In general, soft combining reverse link signals from non-collocated base stations would require significant network communication bandwidth with very little delay, and so the example systems listed above do not support it. In softer handoff, reverse link signals received at multiple sectors in a single BTS can be combined without network signaling. While any type of reverse link signal combining may be deployed within the scope of the present invention, in the example systems described above, reverse link power control maintains quality such that reverse link frames are successfully decoded at one BTS (switching diversity).

In a simultaneously shared communication resource system, such as IS-95, IS-2000, or the corresponding portion of a 1xEV-DV system, each base station in soft handoff with a mobile station (i.e., in the mobile station's Active Set) measures the reverse link pilot quality of that mobile station and sends out a stream of power control commands. In IS-95 or IS-2000 Rev. B, each stream is punctured onto the Forward Fundamental Channel (F-FCH) or the Forward Dedicated Control Channel (F-DCCH), if either is assigned. The stream of commands for a mobile station is called the Forward Power Control Subchannel (F-PCSCH) for that mobile station. The mobile station receives the parallel command streams from all its Active Set members for each base station (multiple sectors from one BTS, if all in the Active Set of the mobile station, send the same command to that mobile station) and determines if an "up" or "down" command was sent. The mobile station modifies the reverse link transmit power level accordingly, using the "Or-of-downs" rule, that is, the transmit power level is reduced if any "down" command is received, and increased otherwise.

The transmit power level of the F-PCSCH is typically tied to the level of the host F-FCH or F-DCCH that carries the subchannel. The host F-FCH or F-DCCH transmit power level at the base station is determined by the feedback from the mobile station on the Reverse Power Control Subchannel (R-PCSCH), which occupies the last quarter of the Reverse Pilot Channel (R-PICH). Since the F-FCH or the F-DCCH from each base station forms a single stream of traffic channel frames, the R-PCSCH reports the combined decoding results of these legs. Erasures of the F-FCH or the F-DCCH determine the required Eb/Nt set point of the outer loop, which in turn drives the inner loop commands on the R-PCSCH and thus the base station transmit levels of the F-FCH, F-DCCH, as well as the F-PCSCH on them.

Due to the potential differences in reverse link path loss to each base station from a single mobile station in soft handoff, some of the base stations in the Active Set may not receive the R-PCSCH reliably and may not correctly control the forward link power of the F-FCH, F-DCCH, and the F-PCSCH. The base stations may need to re-align the transmit levels among themselves so that the mobile station retains the spatial diversity gain of soft handoff. Otherwise, some of the forward link legs may carry little or no traffic signal energy due to errors in the feedback from the mobile station.

Since different base stations may need different mobile station transmit power for the same reverse link set point or reception quality, the power control commands from different base stations may be different and cannot be soft combined at the MS. When new members are added to the Active Set (i.e. no soft handoff to 1-way soft handoff, or from 1-way to 2-way, etc.), the F-PCSCH transmit power is increased relative to its host F-FCH or F-DCCH.

In a 1xEV-DV system, the Forward Common Power Control Channel (F-CPCCH) transports the reverse link power control commands for mobile stations when neither the Forward Fundamental Channel (F-FCH) nor the Forward Dedicated Control Channel (F-DCCH) are assigned. The serving base station may use the information on the Reverse Channel Quality Indicator Channel (R-CQICH) to determine the transmit power level of the F-CPCCH. The R-CQICH is principally used in scheduling to determine the appropriate forward link transmission format.

However, when the mobile station is in soft handoff, the R-CQICH only reports the forward link pilot quality of the serving base station sector and therefore cannot be used to directly power control the F-CPCCH from the non-serving base stations. Techniques for this are disclosed in U.S. patent application Ser. No. 60/356,929, entitled "Method and Apparatus for Forward Link Power Control During Soft Handoff in a Communication System", filed Feb. 12, 2002, assigned to the assignee of the present invention.

Example Base Station and Mobile Station Embodiments

Figure 3:
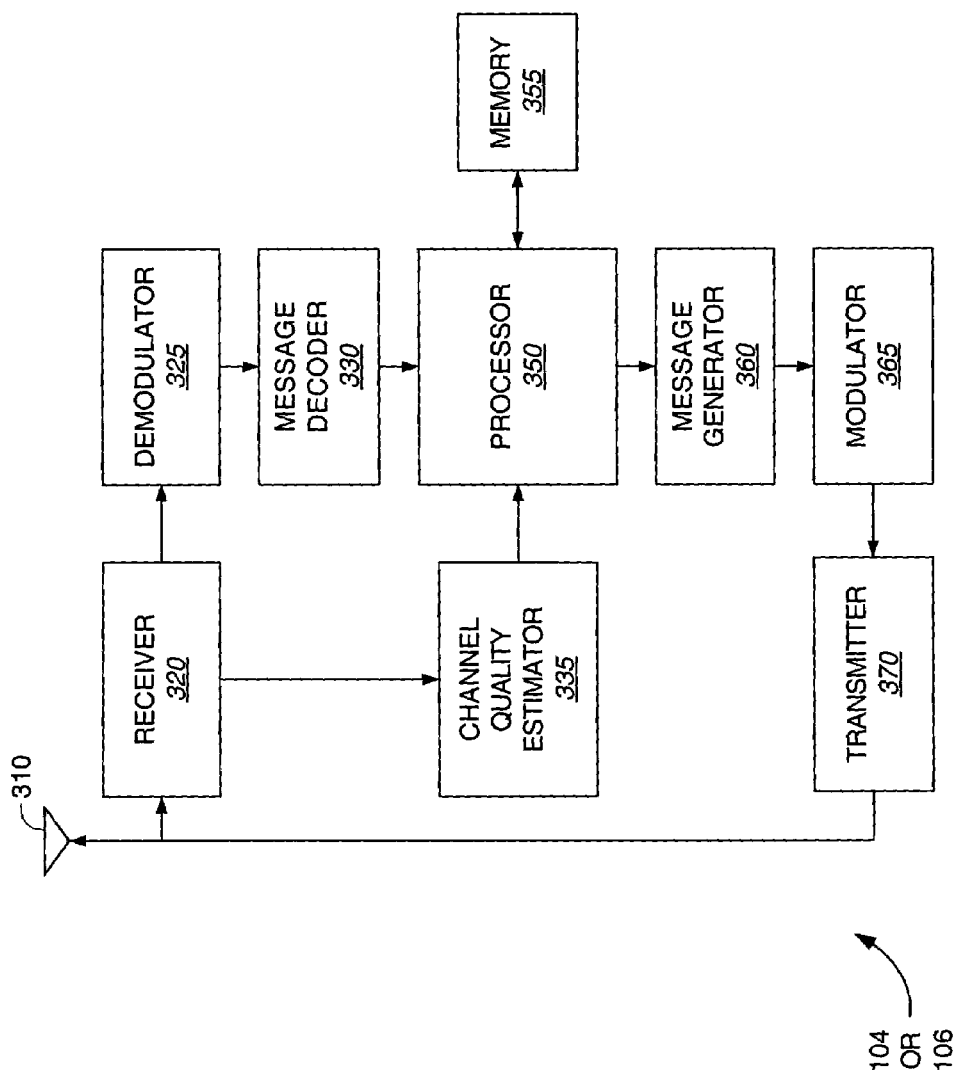
FIG. 3 is a block diagram of a wireless communication device, such as a mobile station or base station.

FIG. 3 is a block diagram of a wireless communication device, such as mobile station 106 or base station 104. The blocks depicted in this example embodiment will generally be a subset of the components included in either a base station 104 or mobile station 106. Those of skill in the art will readily adapt the embodiment shown in FIG. 3 for use in any number of base station or mobile station configurations.

Signals are received at antenna 310 and delivered to receiver 320. Receiver 320 performs processing according to one or more wireless system standards, such as the standards listed above. Receiver 320 performs various processing such as Radio Frequency (RF) to baseband conversion, amplification, analog to digital conversion, filtering, and the like. Various techniques for receiving are known in the art. Receiver 320 may be used to measure channel quality of the forward or reverse link, when the device is a mobile station or base station, respectively, although a separate channel quality estimator 335 is shown for clarity of discussion, detailed below.

Signals from receiver 320 are demodulated in demodulator 325 according to one or more communication standards. In an example embodiment, a demodulator capable of demodulating 1xEV-DV signals is deployed. In alternate embodiments, alternate standards may be supported, and embodiments may support multiple communication formats. Demodulator 330 may perform RAKE receiving, equalization, combining, deinterleaving, decoding, and various other functions as required by the format of the received signals. Various demodulation techniques are known in the art. In a base station 104, demodulator 325 will demodulate according to the reverse link. In a mobile station 106, demodulator 325 will demodulate according to the forward link. Both the data and control channels described herein are examples of channels that can be received and demodulated in receiver 320 and demodulator 325. Demodulation of the forward data channel will occur in accordance with signaling on the control channel, as described above.

Message decoder 330 receives demodulated data and extracts signals or messages directed to the mobile station 106 or base station 104 on the forward or reverse links, respectively. Message decoder 330 decodes various messages used in setting up, maintaining and tearing down a call (including voice or data sessions) on a system. Messages may include channel quality indications, such as C/I measurements, power control messages, or control channel messages used for demodulating the forward data channel. Various types of control messages may be decoded in either a base station 104 or mobile station 106 as transmitted on the reverse or forward links, respectively. For example, described below are request messages and grant messages for scheduling reverse link data transmission for generation in a mobile station or base station, respectively. Various other message types are known in the art and may be specified in the various communication standards being supported. The messages are delivered to processor 350 for use in subsequent processing. Some or all of the functions of message decoder 330 may be carried out in processor 350, although a discrete block is shown for clarity of discussion. Alternatively, demodulator 325 may decode certain information and send it directly to processor 350 (a single bit message such as an ACK/NAK or a power control up/down command are examples). As an example, a forward link command signal, called the Common Congestion Control subchannel (F-OLCH), may be carried as a subchannel on the Forward Common Power Control Channel (F-CPCCH), and can be used to indicate the loading on the reverse link. Various embodiments, described below, detail means for generating this signal for transmission on the forward link, and the corresponding mobile station response for transmission on the reverse link.

Channel quality estimator 335 is connected to receiver 320, and used for making various power level estimates for use in procedures described herein, as well as for use in various other processing used in communication, such as demodulation. In a mobile station 106, C/I measurements may be made. In addition, measurements of any signal or channel used in the system may be measured in the channel quality estimator 335 of a given embodiment. As described more fully below, power control channels are another example. In a base station 104 or mobile station 106, signal strength estimations, such as received pilot power can be made. Channel quality estimator 335 is shown as a discrete block for clarity of discussion only. It is common for such a block to be incorporated within another block, such as receiver 320 or demodulator 325. Various types of signal strength estimates can be made, depending on which signal or which system type is being estimated. In general, any type of channel quality metric estimation block can be deployed in place of channel quality estimator 335 within the scope of the present invention. In a base station 104, the channel quality estimates are delivered to processor 350 for use in scheduling, or determining the reverse link quality, as described further below. Channel quality estimates may be used to determine whether up or down power control commands are required to drive either the forward or reverse link power to the desired set point. The desired set point may be determined with an outer loop power control mechanism, as described above.

Signals are transmitted via antenna 310. Transmitted signals are formatted in transmitter 370 according to one or more wireless system standards, such as those listed above. Examples of components that may be included in transmitter 370 are amplifiers, filters, digital-to-analog (D/A) converters, radio frequency (RF) converters, and the like. Data for transmission is provided to transmitter 370 by modulator 365. Data and control channels can be formatted for transmission in accordance with a variety of formats. Data for transmission on the forward link data channel may be formatted in modulator 365 according to a rate and modulation format indicated by a scheduling algorithm in accordance with a C/I or other channel quality measurement. A scheduler, such as scheduler 240, described above, may reside in processor 350. Similarly, transmitter 370 may be directed to transmit at a power level in accordance with the scheduling algorithm. Examples of components which may be incorporated in modulator 365 include encoders, interleavers, spreaders, and modulators of various types. A reverse link design, including example modulation formats and access control, suitable for deployment on a 1xEV-DV system is also described below, Message generator 360 may be used to prepare messages of various types, as described herein. For example, C/I messages may be generated in a mobile station for transmission on the reverse link. Various types of control messages may be generated in either a base station 104 or mobile station 106 for transmission on the forward or reverse links, respectively. For example, described below are request messages and grant messages for scheduling reverse link data transmission for generation in a mobile station or base station, respectively.

Data received and demodulated in demodulator 325 may be delivered to processor 350 for use in voice or data communications, as well as to various other components. Similarly data for transmission may be directed to modulator 365 and transmitter 370 from processor 350. For example, various data applications may be present on processor 350, or on another processor included in the wireless communication device 104 or 106 (not shown). A base station 104 may be connected, via other equipment not shown, to one or more external networks, such as the Internet (not shown). A mobile station 106 may include a link to an external device, such as a laptop computer (not shown).

Processor 350 may be a general-purpose microprocessor, a digital signal processor (DSP), or a special-purpose processor. Processor 350 may perform some or all of the functions of receiver 320, demodulator 325, message decoder 330, channel quality estimator 335, message generator 360, modulator 365, or transmitter 370, as well as any other processing required by the wireless communication device. Processor 350 may be connected with special-purpose hardware to assist in these tasks (details not shown). Data or voice applications may be external, such as an externally connected laptop computer or connection to a network, may run on an additional processor within wireless communication device 104 or 106 (not shown), or may run on processor 350 itself. Processor 350 is connected with memory 355, which can be used for storing data as well as instructions for performing the various procedures and methods described herein. Those of skill in the art will recognize that memory 355 may be comprised of one or more memory components of various types, that may be embedded in whole or in part within processor 350.

1xEV-DV Reverse Link Design Considerations

In this section, various factors considered in the design of an example embodiment of a reverse link of a wireless communication system are described. In many of the embodiments, detailed further in following sections, signals, parameters, and procedures associated with the 1xEV-DV standard are used. This standard is described for illustrative purposes only, as each of the aspects described herein, and combinations thereof, may be applied to any number of communication systems within the scope of the present invention. This section serves as a partial summary of various aspects of the invention, although it is not exhaustive. Example embodiments are detailed further in subsequent sections below, in which additional aspects are described.

In many cases, reverse link capacity is interference limited. Base stations allocate available reverse link communication resources to mobile stations for efficient utilization to maximize throughput in accordance with Quality of Service (QoS) requirements for the various mobile stations.

Maximizing the use of the reverse link communication resource involves several factors. One factor to consider is the mix of scheduled reverse link transmissions from various mobile stations, each of which may be experiencing varying channel quality at any given time. To increase overall throughput (the aggregate data transmitted by all the mobile stations in the cell), it is desirable for the entire reverse link to be fully utilized whenever there is reverse link data to be sent. To fill the available capacity, mobile stations may be granted access at the highest rate they can support, and additional mobile stations may be granted access until capacity is reached. One factor a base station may consider in deciding which mobile stations to schedule is the maximum rate each mobile can support and the amount of data each mobile station has to send. A mobile station capable of higher throughput may be selected instead of an alternate mobile station whose channel does not support the higher throughput.

Another factor to be considered is the quality of service required by each mobile station. While it may be permissible to delay access to one mobile station in hopes that the channel will improve, opting instead to select a better situated mobile station, it may be that suboptimal mobile stations may need to be granted access to meet minimum quality of service guarantees. Thus, the data throughput scheduled may not be the absolute maximum, but rather maximized considering channel conditions, available mobile station transmit power, and service requirements. It is desirable for any configuration to reduce the signal to noise ratio for the selected mix.

Various scheduling mechanisms are described below for allowing a mobile station to transmit data on the reverse link. One class of reverse link transmission involves the mobile station making a request to transmit on the reverse link. The base station makes a determination of whether resources are available to accommodate the request. A grant can be made to allow the transmission. This handshake between the mobile station and the base station introduces a delay before the reverse link data can be transmitted. For certain classes of reverse link data, the delay may be acceptable. Other classes may be more delay-sensitive, and alternate techniques for reverse link transmission are detailed below to mitigate delay.

In addition, reverse link resources are expended to make a request for transmission, and forward link resources are expended to respond to the request, i.e. transmit a grant. When a mobile station's channel quality is low, i.e. low geometry or deep fading, the power required on the forward link to reach the mobile may be relatively high. Various techniques are detailed below to reduce the number or required transmit power of requests and grants required for reverse link data transmission.

To avoid the delay introduced by a request/grant handshake, as well as to conserve the forward and reverse link resources required to support them, an autonomous reverse link transmission mode is supported. A mobile station may transmit data at a limited rate on the reverse link without making a request or waiting for a grant.

The base station allocates a portion of the reverse link capacity to one or more mobile stations. A mobile station that is granted access is afforded a maximum power level. In the example embodiments described herein, the reverse link resource is allocated using a Traffic to Pilot (T/P) ratio. Since the pilot signal of each mobile station is adaptively controlled via power control, specifying the T/P ratio indicates the available power for use in transmitting data on the reverse link. The base station may make specific grants to one or more mobile stations, indicating a T/P value specific to each mobile station. The base station may also make a common grant to the remaining mobile stations which have requested access, indicating a maximum T/P value that is allowed for those remaining mobile stations to transmit. Autonomous and scheduled transmission, as well as individual and common grants, are detailed further below.

Various scheduling algorithms are known in the art, and more are yet to be developed, which can be used to determine the various specific and common T/P values for grants in accordance with the number of registered mobile stations, the probability of autonomous transmission by the mobile stations, the number and size of the outstanding requests, expected average response to grants, and any number of other factors. In one example, a selection is made based on Quality of Service (QoS) priority, efficiency, and the achievable throughput from the set of requesting mobile stations. One example scheduling technique is disclosed in co-pending U.S. patent application Ser. No. 60/439,989, entitled "SYSTEM AND METHOD FOR A TIME-SCALABLE PRIORITY-BASED SCHEDULER", filed Jan. 13, 2003, assigned to the assignee of the present invention. Additional references include U.S. Pat. No. 5,914,950, entitled "METHOD AND APPARATUS FOR REVERSE LINK RATE SCHEDULING", and U.S. Pat. No. 5,923,650, also entitled "METHOD AND APPARATUS FOR REVERSE LINK RATE SCHEDULING", both assigned to the assignee of the present invention.

A mobile station may transmit a packet of data using one or more subpackets, where each subpacket contains the complete packet information (each subpacket is not necessarily encoded identically, as various encoding or redundancy may be deployed throughout various subpackets). Retransmission techniques may be deployed to ensure reliable transmission, for example ARQ. Thus, if the first subpacket is received without error (using a CRC, for example), a positive Acknowledgement (ACK) is sent to the mobile station and no additional subpackets will be sent (recall that each subpacket comprises the entire packet information, in one form or another). If the first subpacket is not received correctly, then a Negative Acknowledgement signal (NAK) is sent to the mobile station, and the second subpacket will be transmitted. The base station can combine the energy of the two subpackets and attempt to decode. The process may be repeated indefinitely, although it is common to specify a maximum number of subpackets. In example embodiments described herein, up to four subpackets may be transmitted. Thus, the probability of correct reception increases as additional subpackets are received. (Note that a third response from a base station, ACK-and-Continue, is useful for reducing request/grant overhead. This option is detailed further below).

As just described, a mobile station may trade off throughput for latency in deciding whether to use autonomous transfer to transmit data with low latency or requesting a higher rate transfer and waiting for a common or specific grant. In addition, for a given T/P, the mobile station may select a data rate to suit latency or throughput. For example, a mobile station with relatively few bits for transmission may decide that low latency is desirable. For the available T/P (probably the autonomous transmission maximum in this example, but could also be the specific or common grant T/P), the mobile station may select a rate and modulation format such that the probability of the base station correctly receiving the first subpacket is high. Although retransmission will be available if necessary, it is likely that this mobile station will be able to transmit its data bits in one subpacket. In the example embodiments described herein, each subpacket is transmitted over a period of 5 ms. Therefore, in this example, a mobile station may make an immediate autonomous transfer that is likely to be received at the base station following a 5 ms interval. Note that, alternatively, the mobile station may use the availability of additional subpackets to increase the amount of data transmitted for a given T/P. So, a mobile station may select autonomous transfer to reduce latency associated with requests and grants, and may additionally trade the throughput for a particular T/P to minimize the number of subpackets (hence latency) required. Even if the full number of subpackets is selected, autonomous transfer will be lower latency than request and grant for relatively small data transfers. Those of skill in the art will recognize that as the amount of data to be transmitted grows, requiring multiple packets for transmission, the overall latency may be reduced by switching to a request and grant format, since the penalty of the request and grant will eventually be offset by the increased throughput of a higher data rate across multiple packets. This process is detailed further below, with an example set of transmission rates and formats that can be associated with various T/P assignments.

Mobile stations in varying locations within the cell, and traveling at varying speeds will experience varying channel conditions. Power control is used to maintain reverse link signals. Pilot power received at base station may be power controlled to be approximately equal from various mobile stations. Then, as described above, the T/P ratio is an indicator of the amount of the communication resource used during reverse link transmission. It is desirable to maintain the proper balance between pilot and traffic, for a given mobile station transmit power, transmission rate, and modulation format.

Mobile stations may have a limited amount of transmit power available. Thus, for example, the communication rate may be limited by the maximum power of the mobile station power amplifier. Mobile station transmit power may also be governed by the base station to avoid excessive interference with other mobile stations, using power control and various data transmission scheduling techniques. The amount of available mobile station transmit power will be allocated to transmitting one or more pilot channels, one or more data channels, and any other associated control channels. To increase data throughput, the rate of transmission may be increased by reducing code rate, increasing the symbol rate, or using a higher order modulation scheme. To be effective, the associated pilot channel must be received reliably to provide a phase reference for demodulation. Thus, a portion of the available transmit power is allocated to the pilot, and increasing that portion will increase the reliability of pilot reception. However, increasing the portion of available transmit power allocated to the pilot also decreases the amount of power available for data transmission, and increasing the portion of available transmit power allocated to the data also increases demodulation reliability. An appropriate modulation format and transmission rate can be determined for a given T/P.

Due to variations in data transmission demand, and discontinuous allocation of the reverse link to mobile stations, the transmission rate for a mobile station may vary rapidly. The desired pilot power level for a transmission rate and format may thus change instantaneously, as just described. Without prior knowledge of rate changes (which may be expected in the absence of costly signaling or reduced flexibility in scheduling), a power control loop may attempt to counteract a sudden change in received power at the base station, perhaps interfering with the decoding of the beginning of the packet. Similarly, due to incremental step sizes commonly deployed in power control, it may take a relatively long time to reduce the pilot once the transmission rate and format have been reduced. One technique to combat these, and other phenomena (detailed further below), is to deploy a secondary pilot in addition to a primary pilot. The primary pilot can be used for power control and demodulation of all channels, including control channels and low rate data channels. When additional pilot power is needed for higher level modulation or increased data rate, additional pilot power may be transmitted on a secondary pilot. The power of the secondary pilot can be determined relative to the primary pilot and the incremental pilot power required for the selected transmission. The base station may receive both pilots, combine them, and use them to determine phase and magnitude information for demodulation of the traffic. Instantaneous increases or decreases in the secondary pilot do not interfere with power control.

Example embodiments, detailed further below, realize the benefits of a secondary pilot, as just described, by use of an already deployed communication channel. Thus, capacity is generally improved, since in part of the expected range of operation, the information transmitted on the communication channel requires little or no additional capacity than required to perform the pilot function. As is well known in the art, a pilot signal is useful for demodulation because it is a known sequence, and hence the phase and magnitude of the signal may be derived from the pilot sequence for demodulation. However, transmitting pilot without carrying data costs reverse link capacity. Hence, unknown data is modulated on the "secondary pilot", and thus the unknown sequence must be determined in order to extract information useful for demodulation of the traffic signal. In an example embodiment, the Reverse Rate Indication Channel (R-RICH) is used to provide the Reverse Rate Indicator (RRI), the rate associated with the transmission on the Reverse Enhanced Supplemental Channel (R-ESCH). In addition, the R-RICH power is adjusted in accordance with the pilot power requirements, which can be used at the base station to provide a secondary pilot. That the RRI is one of a known set of values aids in determining the unknown component of the R-RICH channel. In an alternate embodiment, any channel may be modified to serve as a secondary pilot. This technique is detailed further below.

Reverse Link Data Transmission

One goal of a reverse link design may be to maintain the Rise-over-Thermal (RoT) at the base station relatively constant as long as there is reverse link data to be transmitted. Transmission on the reverse link data channel is handled in two different modes:

Autonomous Transmission: This case is used for traffic requiring low delay. The mobile station is allowed to transmit immediately, up to a certain transmission rate, determined by the serving base station (i.e. the base station to which the mobile station directs its Channel Quality Indicator (CQI)). A serving base station is also referred to as a scheduling base station or a granting base station. The maximum allowed transmission rate for autonomous transmission can be signaled by the serving base station dynamically based on system load, congestion, etc.

Scheduled Transmission: The mobile station sends an estimate of its buffer size, available power, and possibly other parameters. The base station determines when the mobile station is allowed to transmit. The goal of a scheduler is to limit the number of simultaneous transmissions, thus reducing the interference between mobile stations. The scheduler may attempt to have mobile stations in regions between cells transmit at lower rates so as to reduce interference to neighboring cells, and to tightly control RoT to protect the voice quality on the R-FCH, the DV feedback on R-CQICH and the acknowledgments (R-ACKCH), as well as the stability of the system.

Various embodiments, detailed herein, contain one or more features designed to improve throughput, capacity, and overall system performance of the reverse link of a wireless communication system. For illustrative purposes only, the data portion of a 1xEV-DV system, in particular, optimization of transmission by various mobile stations on the Enhanced Reverse Supplemental Channel (R-ESCH), is described. Various forward and reverse link channels used in one or more of the example embodiments are detailed in this section. These channels are generally a subset of the channels used in a communication system.

Figure 4:
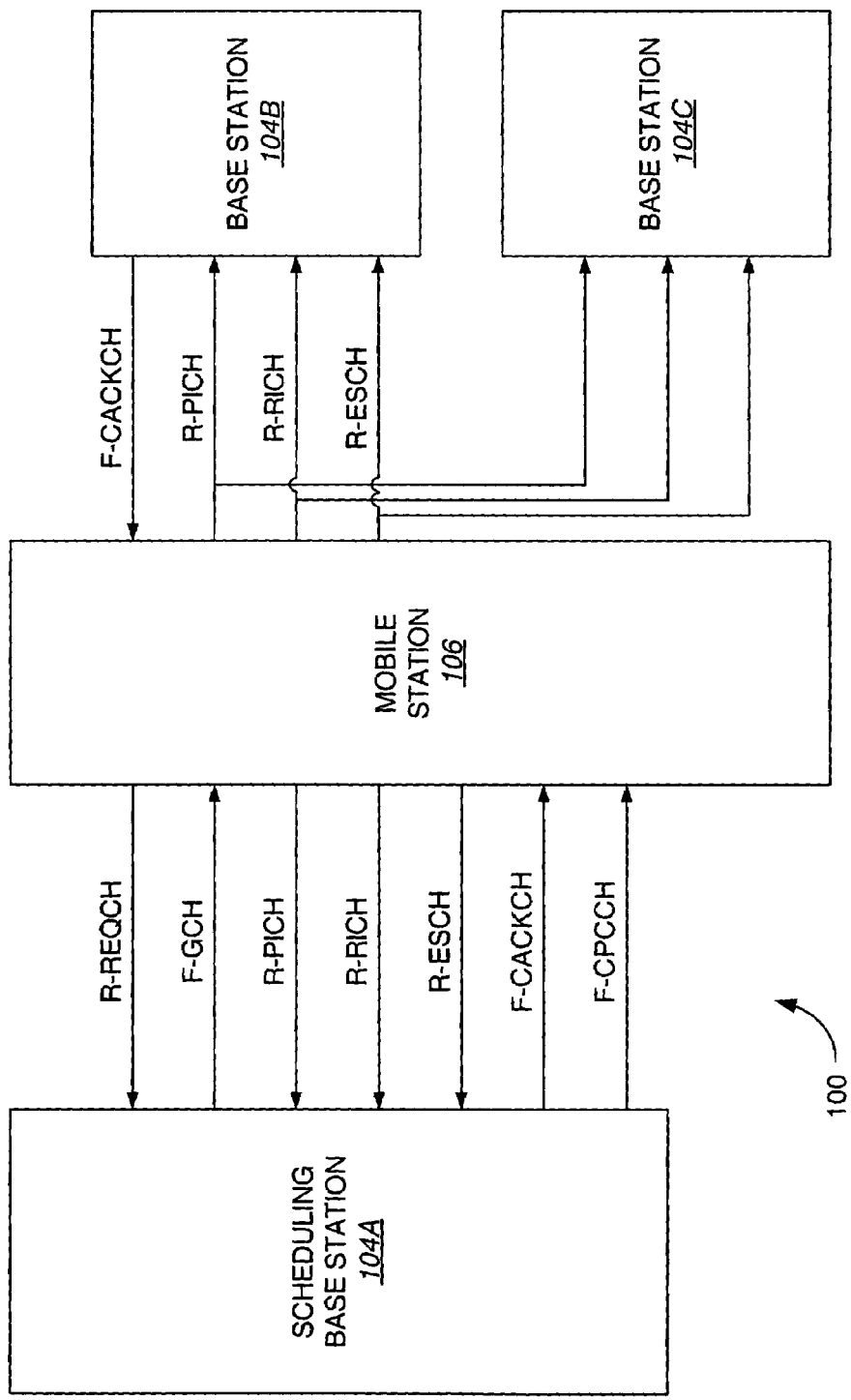
FIG. 4 depicts an exemplary embodiment of data and control signals for reverse link data communication.

FIG. 4 depicts an exemplary embodiment of data and control signals for reverse link data communication. A mobile station 106 is shown communicating over various channels, each channel connected to one or more base stations 104A-104C. Base station 104A is labeled as the scheduling base station. The other base stations 104B and 104C are part of the Active Set of mobile station 106. There are four types of reverse link signals and two types of forward link signals shown. They are described below.

R-REQCH

The Reverse Request Channel (R-REQCH) is used by the mobile station to request from the scheduling base station a reverse link transmission of data. In the example embodiment, requests are for transmission on the R-ESCH (detailed further below). In the example embodiment, a request on the R-REQCH includes the T/P ratio the mobile station can support, variable according to changing channel conditions, and the buffer size (i.e. the amount of data awaiting transmission). The request may also specify the Quality of Service (QoS) for the data awaiting transmission. Note that a mobile station may have a single QoS level specified for the mobile station, or, alternately, different QoS levels for different types of service options. Higher layer protocols may indicate the QoS, or other desired parameters (such as latency or throughput requirements) for various data services. In an alternative embodiment, a Reverse Dedicated Control Channel (R-DCCH), used in conjunction with other reverse link signals, such as the Reverse Fundamental Channel (R-FCH) (used for voice services, for example), may be used to carry access requests. In general, access requests may be described as comprising a logical channel, i.e. a Reverse Schedule Request Channel (r-srch), which may be mapped onto any existing physical channel, such as the R-DCCH. The example embodiment is backward compatible with existing CDMA systems such as cdma2000® Revision C, and the R-REQCH is a physical channel that can be deployed in the absence of either the R-FCH or the R-DCCH. For clarity, the term R-REQCH is used to describe the access request channel in embodiment descriptions herein, although those of skill in the art will readily extend the principles to any type of access request system, whether the access request channel is logical or physical. The R-REQCH may be gated off until a request is needed, thus reducing interference and conserving system capacity.

In the example embodiment, the R-REQCH has 12 input bits, that consist of the following: 4 bits to specify the maximum R-ESCH T/P ratio that the mobile can support, 4 bits to specify the amount of data in the mobile's buffer, and 4 bits to specify the QoS. Those of skill in the art will recognize that any number of bits and various other fields may be included in alternate embodiments.

F-GCH

The Forward Grant Channel (F-GCH) is transmitted from the scheduling base station to the mobile station. The F-GCH may be comprised of multiple channels. In the example embodiment, a common F-GCH channel is deployed for making common grants, and one or more individual F-GCH channels are deployed for making individual grants. Grants are made by the scheduling base station in response to one or more requests from one or more mobile stations on their respective R-REQCHs. Grant channels may be labeled as GCHx, where the subscript x identifies the channel number. A channel number 0 may be used to indicate the common grant channel. If N individual channels are deployed, the subscript x may range from 1 to N.

An individual grant may be made to one or more mobile stations, each of which gives permission to the identified mobile station to transmit on the R-ESCH at a specified T/P ratio or below. Making grants on the forward link will naturally introduce overhead that uses some forward link capacity. Various options for mitigating the overhead associated with grants are detailed herein, and other options will be apparent to those of skill in the art in light of the teachings herein.

One consideration is that mobile stations will be situated such that each experiences varying channel quality. Thus, for example, a high geometry mobile station with a good forward and reverse link channel may need a relatively low power for grant signal, and is likely to be able to take advantage of a high data rate, and hence is desirable for an individual grant. A low geometry mobile station, or one experiencing deeper fading, may require significantly more power to receive an individual grant reliably. Such a mobile station may not be the best candidate for an individual grant. A common grant for this mobile station, detailed below, may be less costly in forward link overhead.

In the example embodiment, a number of individual F-GCH channels are deployed to provide the corresponding number of individual grants at a particular time. The F-GCH channels are code division multiplexed. This facilitates the ability to transmit each grant at the power level required to reach just the specific intended mobile station. In an alternative embodiment, a single individual grant channel may be deployed, with the number of individual grants time multiplexed. To vary the power of each grant on a time multiplexed individual F-GCH may introduce additional complexity. Any signaling technique for delivering common or individual grants may be deployed within the scope of the present invention.

In some embodiments, a relatively large number of individual grant channels (i.e. F-GCHs) are deployed, it may be deployed to allow for a relatively large number of individual grants at one time. In such a case, it may be desirable to limit the number of individual grant channels each mobile station has to monitor. In one example embodiment, various subsets of the total number of individual grant channels are defined. Each mobile station is assigned a subset of individual grant channels to monitor. This allows the mobile station to reduce processing complexity, and correspondingly reduce power consumption. The tradeoff is in scheduling flexibility, since the scheduling base station may not be able to arbitrarily assign sets of individual grants (e.g., all individual grants can not be made to members of a single group, since those members, by design, do not monitor one or more of the individual grant channels). Note that this loss of flexibility does not necessarily result in a loss of capacity. For illustration, consider an example including four individual grant channels. The even numbered mobile stations may be assigned to monitor the first two grant channels, and the odd numbered mobile stations may be assigned to monitor the last two. In another example, the subsets may overlap, such as the even mobile stations monitoring the first three grant channels, and the odd mobile stations monitoring the last three grant channels. It is clear that the scheduling base station cannot arbitrarily assign four mobile stations from any one group (even or odd). These examples are illustrative only. Any number of channels with any configuration of subsets may be deployed within the scope of the present invention.

The remaining mobile stations, having made a request, but not receiving an individual grant, may be given permission to transmit on the R-ESCH using a common grant, which specifies a maximum T/P ratio that each of the remaining mobile stations must adhere to. The common F-GCH may also be referred to as the Forward Common Grant Channel (F-CGCH). A mobile station monitors the one or more individual grant channels (or a subset thereof) as well as the common F-GCH. Unless given an individual grant, the mobile station may transmit if a common grant is issued. The common grant indicates the maximum T/P ratio at which the remaining mobile stations (the common grant mobile stations) may transmit for the data with certain type of QoS.

In the example embodiment, each common grant is valid for a number of subpacket transmission intervals. Once receiving a common grant, a mobile station which has sent a request, but doesn't get an individual grant may start to transmit one or more encoder packets within the subsequent transmission intervals. The grant information may be repeated multiple times. This allows the common grant to be transmitted at a reduced power level with respect to an individual grant. Each mobile station may combine the energy from multiple transmissions to reliably decode the common grant. Therefore, a common grant may be selected for mobile stations with low-geometry, for example, where an individual grant is deemed too costly in terms of forward link capacity. However, common grants still require overhead, and various techniques for reducing this overhead are detailed below.

The F-GCH is sent by the base station to each mobile station that the base station schedules for transmission of a new R-ESCH packet. It may also be sent during a transmission or a retransmission of an encoder packet to force the mobile station to modify the T/P ratio of its transmission for the subsequent subpackets of the encoder packet in case congestion control becomes necessary.

Detailed below are examples of timing, including various embodiments with requirements for the interrelationship of access requests and grants of either type (individual or common). Additionally, techniques for reducing the number of grants, and thus the associated overhead, as well as for congestion control are detailed below.

In the example embodiment, the common grant consists of 12 bits including a 3-bit type field to specify the format of the next nine bits. The remaining bits indicate the maximum allowed T/P ratio for 3 classes of mobiles as specified in the type field, with 3 bits denoting the maximum allowable T/P ratio for each class. The mobile classes may be based on QoS requirements, or other criterion. Various other common grant formats are envisioned, and will be readily apparent to one of ordinary skill in the art.

In the example embodiment, an individual grant comprises 12 bits including: 11 bits to specify the Mobile ID and maximum allowed T/P ratio for the mobile station being granted to transmit, or to explicitly signal the mobile station to change its maximum allowed T/P ratio, including setting the maximum allowed T/P ratio to 0 (i.e., telling the mobile station not to transmit the R-ESCH). The bits specify the Mobile ID (1 of 192 values) and the maximum allowed T/P (1 of 10 values) for the specified mobile. In an alternate embodiment, 1 long-grant bit may be set for the specified mobile. When the long-grant bit is set to one, the mobile station is granted permission to transmit a relatively large fixed, predetermined number (which can be updated with signaling) of packets on that ARQ channel. If the long-grant bit is set to zero, the mobile station is granted to transmit one packet. A mobile may be told to turn off its R-ESCH transmissions with the zero T/P ratio specification, and this may be used to signal the mobile station to turn off its transmission on the R-ESCH for a single subpacket transmission of a single packet if the long-grant bit is off or for a longer period if the long-grant bit is on.

R-PICH

The Reverse Pilot Channel (R-PICH) is transmitted from the mobile station to the base stations in the Active Set. The power in the R-PICH may be measured at one or more base stations for use in reverse link power control. As is well known in the art, pilot signals may be used to provide amplitude and phase measurements for use in coherent demodulation. As described above, the amount of transmit power available to the mobile station (whether limited by the scheduling base station or the inherent limitations of the mobile station's power amplifier) is split among the pilot channel, traffic channel or channels, and control channels. Additional pilot power may be needed for higher data rates and modulation formats. To simplify the use of the R-PICH for power control, and to avoid some of the problems associated with instantaneous changes in required pilot power, an additional channel may be allocated for use as a supplemental or secondary pilot. Although, generally, pilot signals are transmitted using known data sequences, as disclosed herein, an information bearing signal may also be deployed for use in generating reference information for demodulation. In an example embodiment, the R-RICH (detailed below) is used to carry the additional pilot power desired.

R-RICH

The Reverse Rate Indicator Channel (R-RICH) is used by the mobile station to indicate the transmission format on the reverse traffic channel, R-ESCH. The R-RICH comprises 5-bit messages. The orthogonal encoder block maps each 5-bit input sequence into a 32-symbol orthogonal sequence. For example each 5-bit input sequence could be mapped to a different Walsh code of length 32. A sequence repetition block repeats the sequence of 32 input symbols three times. A bit repetition block provides at its output the input bit repeated 96 times. A sequence selector block selects between the two inputs, and passes that input to the output. For zero rates, the output of the bit repetition block is passed through. For all other rates, the output of the sequence repetition block is passed through. A signal point mapping block maps an input bit 0 to +1, and an input 1 to −1. Following the signal point mapping block is a Walsh spreading block. The Walsh spreading block spreads each input symbol to 64 chips. Each input symbols multiplies a Walsh code W(48, 64). A Walsh code W(48,64) is the Walsh code of length 64 chips, and index 48. TIA/EIA IS-2000 provides tables describing Walsh codes of various lengths.

Those of skill in the art will recognize that this channel structure is one example only. Various other encoding, repetition, interleaving, signal point mapping, or Walsh encoding parameters could be deployed in alternate embodiments. Additional encoding or formatting techniques, well known in the art, may also be deployed. These modifications fall within the scope of the present invention.

R-ESCH

The Enhanced Reverse Supplemental Channel (R-ESCH) is used as the reverse link traffic data channel in the example embodiments described herein. Any number of transmission rates and modulation formats may be deployed for the R-ESCH. In an example embodiment, the R-ESCH has the following properties: Physical layer retransmissions are supported. For retransmissions when the first code is a Rate ¼ code, the retransmission uses a Rate ¼ code and energy combining is used. For retransmissions when the first code is a rate greater than ¼, incremental redundancy is used. The underlying code is a Rate ⅕ code. Alternatively, incremental redundancy could also be used for all the cases.

Hybrid Automatic-Repeat-Request (HARQ) is supported for both autonomous and scheduled users, both of which may access the R-ESCH.

For the case in which the first code is a Rate ½ code, the frame is encoded as a Rate ¼ code and the encoded symbols are divided equally into two parts. The first half of the symbols are sent in the first transmission, the second half in the second transmission, then first half in the third transmission and so on.

Multiple ARQ-channel synchronous operation may be supported with fixed timing between the retransmissions: a fixed number of sub-packets between consecutive sub-packets of same packet may be allowed. Interlaced transmissions are allowed as well. As an example, for 5 ms frames, 4 channel ARQ could be supported with 3 subpacket delay between subpackets.

Table 1 lists example data rates for the Enhanced Reverse Supplemental Channel. A 5 ms subpacket size is described, and the accompanying channels have been designed to suit choice. Other subpacket sizes may also be chosen, as will be readily apparent to those of skill in the art. The pilot reference level is not adjusted for these channels, i.e. the base station has the flexibility of choosing the T/P to target a given operating point. This max T/P value is signaled on the Forward Grant Channel. The mobile station may use a lower T/P if it is running out of power to transmit, letting HARQ meet the required QoS. Layer 3 signaling messages may also be transmitted over the R-ESCH, allowing the system to operate without the R-FCH and/or R-DCCH.

F-CACKCH

The Forward Common Acknowledgement Channel, or F-CACKCH, is used by the base station to acknowledge the correct reception of the R-ESCH, as well as to extend an existing grant. An acknowledgement (ACK) on the F-CACKCH indicates correct reception of a subpacket. Additional transmission of that subpacket by the mobile station is

TABLE 1

Enhanced Reverse Supplemental Channel Parameters

| Number of Bits per Encoder Packet | Number of 5-ms Slots | Data Rate (kbps) | Data Rate/ 9.6 kbps | Code Rate | Symbol Repetition Factor Before the Interleaver | Modulation | Walsh Channels | Number of Binary Code Symbols in All the Subpackets | Effective Code Rate Including Repetition |
|---|---|---|---|---|---|---|---|---|---|
| 192 | 4 | 9.6 | 1.000 | 1/4 | 2 | BPSK on I | ++-- | 6,144 | +1·1/32 |
| 192 | 3 | 12.8 | 1.333 | 1/4 | 2 | BPSK on I | ++-- | 4,608 | +1·1/24 |
| 192 | 2 | 19.2 | 2.000 | 1/4 | 2 | BPSK on I | ++-- | 3,072 | +1·1/16 |
| 192 | 1 | 38.4 | 4.000 | 1/4 | 2 | BPSK on I | ++-- | 1,536 | 1/8 |
| 384 | 4 | 19.2 | 2.000 | 1/4 | 1 | BPSK on I | ++-- | 6,144 | +1·1/16 |
| 384 | 3 | 25.6 | 2.667 | 1/4 | 1 | BPSK on I | ++-- | 4,608 | +1·1/12 |
| 384 | 2 | 38.4 | 4.000 | 1/4 | 1 | BPSK on I | ++-- | 3,072 | 1/8 |
| 384 | 1 | 76.8 | 8.000 | 1/4 | 1 | BPSK on I | ++-- | 1,536 | 1/4 |
| 768 | 4 | 76.8 | 4.000 | 1/4 | 1 | QPSK | ++-- | 12,288 | +1·1/16 |
| 768 | 3 | 102.4 | 5.333 | 1/4 | 1 | QPSK | ++-- | 9,216 | +1·1/12 |
| 768 | 2 | 153.6 | 8.000 | 1/4 | 1 | QPSK | ++-- | 6,144 | 1/8 |
| 768 | 1 | 307.2 | 16.000 | 1/4 | 1 | QPSK | ++-- | 3,072 | 1/4 |
| 1,536 | 4 | 76.8 | 8.000 | 1/4 | 1 | QPSK | +- | 24,576 | +1·1/16 |
| 1,536 | 3 | 102.4 | 10.667 | 1/4 | 1 | QPSK | +- | 18,432 | +1·1/12 |
| 1,536 | 2 | 153.6 | 16.000 | 1/4 | 1 | QPSK | +- | 12,288 | 1/8 |
| 1,536 | 1 | 307.2 | 32.000 | 1/4 | 1 | QPSK | +- | 6,144 | 1/4 |
| 2,304 | 4 | 115.2 | 12.000 | 1/4 | 1 | QPSK | ++--/+- | 36,864 | +1·1/16 |
| 2,304 | 3 | 153.6 | 16.000 | 1/4 | 1 | QPSK | ++--/+- | 27,648 | +1·1/12 |
| 2,304 | 2 | 230.4 | 24.000 | 1/4 | 1 | QPSK | ++--/+- | 18,432 | 1/8 |
| 2,304 | 1 | 460.8 | 48.000 | 1/4 | 1 | QPSK | ++--/+- | 9,216 | 1/4 |
| 3,072 | 4 | 153.6 | 16.000 | 1/5 | 1 | QPSK | ++--/+- | 36,864 | +1·1/12 |
| 3,072 | 3 | 204.8 | 21.333 | 1/5 | 1 | QPSK | ++--/+- | 27,648 | 1/9 |
| 3,072 | 2 | 307.2 | 32.000 | 1/5 | 1 | QPSK | ++--/+- | 18,432 | 1/6 |
| 3,072 | 1 | 614.4 | 64.000 | 1/5 | 1 | QPSK | ++--/+- | 9,216 | 1/3 |
| 4,608 | 4 | 230.4 | 24.000 | 1/5 | 1 | QPSK | ++--/+- | 36,864 | 1/8 |
| 4,608 | 3 | 307.2 | 32.000 | 1/5 | 1 | QPSK | ++--/+- | 27,648 | 1/6 |
| 4,608 | 2 | 460.8 | 48.000 | 1/5 | 1 | QPSK | ++--/+- | 18,432 | 1/4 |
| 4,608 | 1 | 921.6 | 96.000 | 1/5 | 1 | QPSK | ++--/+- | 9,216 | 1/2 |
| 6,144 | 4 | 307.2 | 32.000 | 1/5 | 1 | QPSK | ++--/+- | 36,864 | 1/6 |
| 6,144 | 3 | 409.6 | 42.667 | 1/5 | 1 | QPSK | ++--/+- | 27,648 | 2/9 |
| 6,144 | 2 | 614.4 | 64.000 | 1/5 | 1 | QPSK | ++--/+- | 18,432 | 1/3 |
| 6,144 | 1 | 1228.8 | 128.000 | 1/5 | 1 | QPSK | ++--/+- | 9,216 | 2/3 |

In an example embodiment, turbo coding is used for all the rates. With R=1/4 coding, an interleaver similar to the current cdma2000 reverse link is used. With R=1/5 coding, an interleaver similar to the cdma2000 Forward Packet Data Channel is used.

The number of bits per encoder packet includes the CRC bits and 6 tail bits. For an encoder packet size of 192 bits, a 12-bit CRC is used; otherwise, a 16-bit CRC is used. The 5-ms slots are assumed to be separated by 15 ms to allow time for ACK/NAK responses. If an ACK is received, the remaining slots of the packet are not transmitted.

The 5 ms subpacket duration, and associated parameters, just described, serve as an example only. Any number of combinations of rates, formats, subpacket repetition options, subpacket duration, etc. will be readily apparent to those of skill in the art in light of the teaching herein. An alternate 10 ms embodiment, using 3 ARQ channels, could be deployed. In one embodiment, a single subpacket duration or frame size is selected. For example, either a 5 ms or 10 ms structure would be selected. In an alternate embodiment, a system may support multiple frame durations.

unnecessary. The negative acknowledgement (NAK) on the F-CACKCH allows the mobile station to transmit the next subpacket up to the maximum allowed number of subpacket per packet. A third command, the ACK-and-Continue, allows the base station to acknowledge successful reception of a packet and, at the same time, permit the mobile station to transmit using the grant that led to the successfully received packet. One embodiment of the F-CACKCH uses +1 values for the ACK symbols, NULL symbols for the NAK symbols, and −1 values for the ACK-and-Continue symbols. In various example embodiments, detailed further below, up to 96 Mobile IDs can be supported on one F-CACKCH. Additional F-CACKCHs may be deployed to support additional Mobile IDs.

On-off keying (i.e., not sending NAK) on the F-CACKCH allows the base stations (especially non-scheduling base stations) an option of not sending the ACK when the cost (required power) of doing so is too high. This provides the base station a trade-off between the forward link and reverse link capacity, since a correctly received packet that is not ACKed will likely trigger a re-transmission at a later point in time.

A Hadamard Encoder is one example of an encoder for mapping onto a set of orthogonal functions. Various other techniques may also be deployed. For example, any Walsh Code or other similar error correcting code may be used to encode the information bits. Different users may be transmitted to at different power levels if independent each subchannel has an independent channel gain. The F-CACKCH conveys one dedicated tri-valued flag per user. Each user monitors the F-ACKCH from all base stations in its Active Set (or, alternatively, signaling may define a reduced active set to reduce complexity).

In various embodiments, two channels are each covered by a 128-chip Walsh cover sequence. One channel is transmitted on the I channel, and the other is transmitted on the Q channel. Another embodiment of the F-CACKCH uses a single 128-chip Walsh cover sequence to support up to 192 mobile stations simultaneously. This approach uses 10-ms duration for each tri-valued flag.

There are several ways of operating the ACK channel. In one embodiment, it may be operated such that a "1" is transmitted for an ACK. No transmission implies a NAK, or the "off" state. A "−1" transmission refers to ACK-and-Continue, i.e. the same grant is repeated to the mobile station. This saves the overhead of a new grant channel.

To review, when the mobile station has a packet to send that requires usage of the R-ESCH, it sends the request on the R-REQCH. The base station may respond with a grant using the F-CGCH, or an F-GCH. However, this operation is somewhat expensive. To reduce the forward link overhead, F-CACKCH can send the "ACK-and-Continue" flag, which extends the existing grant at low cost by the scheduling base station. This method works for both individual and common grants. ACK-and-Continue is used from the granting base station, and extends the current grant for 1 more encoder packet on the same ARQ channel.

Note that, as shown in FIG. 4, not every base station in the Active Set is required to send back the F-CACKCH. The set of base stations sending the F-CACKCH in soft handoff may be a subset of the Active Set. Example techniques for transmitting the F-CACKCH are disclosed in co-pending U.S. patent application Ser. No. 10/611,333, entitled "CODE DIVISION MULTIPLEXING COMMANDS ON A CODE DIVISION MULITIPLEXED CHANNEL", filed Jun. 30, 2003, assigned to the assignee of the present invention (hereinafter the 'AAA application).

F-CPCCH

The Forward Common Power Control Channel (F-CPCCH) is used to power control various reverse link channels, including the R-ESCH when the F-FCH and the F-DCCH are not present. Upon channel assignment, a mobile station is assigned a reverse link power control channel. The F-CPCCH may contain a number of power control subchannels.

The F-CPCCH carries a power control subchannel called the Common Congestion Control subchannel (F-OLCH). The congestion control subchannel is typically at a rate of 100 bps, though other rates can be used. The single bit (which may be repeated for reliability), referred to herein as the busy bit, indicates the mobile stations in autonomous transmission mode, or in the common grant mode, or both, whether to increase or decrease their rate. In an alternate embodiment, individual grant modes may be also be sensitive to this bit. Various embodiments may be deployed with any combination of transmission types responsive to the F-OLCH (detailed further below). This can be done in a probabilistic manner, or deterministically.

In one embodiment, setting the busy bit to '0' indicates that mobile stations responsive to the busy bit should decrease their transmission rate. Setting the busy bit to '1' indicates a corresponding increase in transmission rate. Myriad other signaling schemes may be deployed, as will be readily apparent to those of skill in the art, and various alternate examples are detailed below.

During channel assignment, the mobile station is assigned to these special power control channels. A power control channel may control all the mobiles in the system, or alternatively, varying subsets of the mobile stations may be controlled by one or more power control channels. Note that use of this particular channel for congestion control is but one example. The techniques described herein may be used with any means for signaling, as will be detailed further below.

Example Congestion Control Embodiments

To summarize various features introduced above, mobile stations are authorized to make autonomous transmissions, which, while perhaps limited in throughput, allow for low delay. In such a case, the mobile station may transmit without request up to a max R-ESCH T/P ratio, T/PMax_auto, which may be set and adjusted by the base station through signaling.

Scheduling is determined at one or more scheduling base stations, and allocations of reverse link capacity are made through grants transmitted on the F-GCH at a relatively high rate. Scheduling may thus be employed to tightly control the reverse link load and thus protects voice quality (R-FCH), DV feedback (R-CQICH) and DV acknowledgement (R-ACKCH).

An individual grant allows detailed control of a mobile station's transmission. Mobile stations may be selected based upon geometry and QoS to maximize throughput while maintaining required service levels. A common grant allows efficient notification, especially for low geometry mobile stations.

The F-CACKCH channel may send "ACK-and-Continue" commands, which extend existing grants at low cost. This works with both individual grants and common grants. Various embodiments and techniques for scheduling, granting, and transmitting on a shared resource, such as a 1xEV-DV reverse link, are disclosed in co-pending U.S. patent application Ser. No. 10/646,955, entitled "SCHEDULED AND AUTONOMOUS TRANSMISSION AND ACKNOWLEDGEMENT", filed Aug. 21, 2003, assigned to the assignee of the present invention, and incorporated by reference herein.

Figure 5:
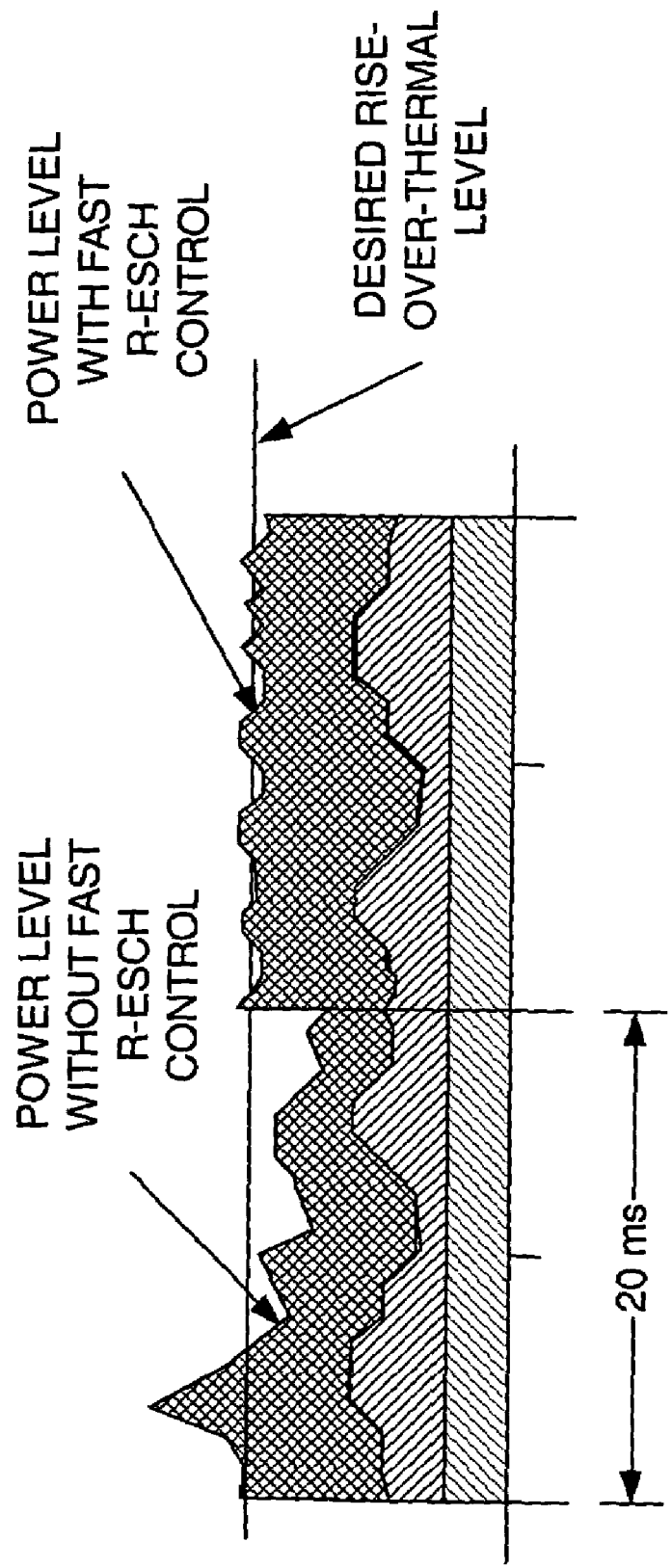
FIG. 5 contrasts the R-ESCH power level with and without fast control.

FIG. 5 contrasts the R-ESCH power level with and without fast control. During transmission on the R-ESCH, each mobile station transmits in accordance with the rate granted on the R-GCH (i.e., an individual grant), or R-CGCH (i.e., a common grant), or transmits autonomously. The mobile station can transmit up to the maximum rate that is permitted. If the R-ESCH that the mobile station is using has been assigned a congestion control subchannel (F-OLCH), then the mobile station adjusts the transmission rate based upon the bits that are received in the congestion control subchannel.

There are a variety of ways to do this. If all the mobiles are classified into three classes: autonomous, common granted, or individually granted, then this channel may be applicable to all users, only on one class of users, or to any two classes of users depending on the level of control desired.

If the mobiles controlled by the F-CGCH change rates probabilistically, it may not be necessary to add an additional bit on the F-CPCCH. This information (i.e., the busy bit) may be sent on the F-CGCH. The absence of a busy bit may be interpreted by mobile stations as a license to increase to the maximum rate allowed. Alternatively, mobile stations may also be allowed to go up probabilistically. Various examples are detailed below.

Figure 6:
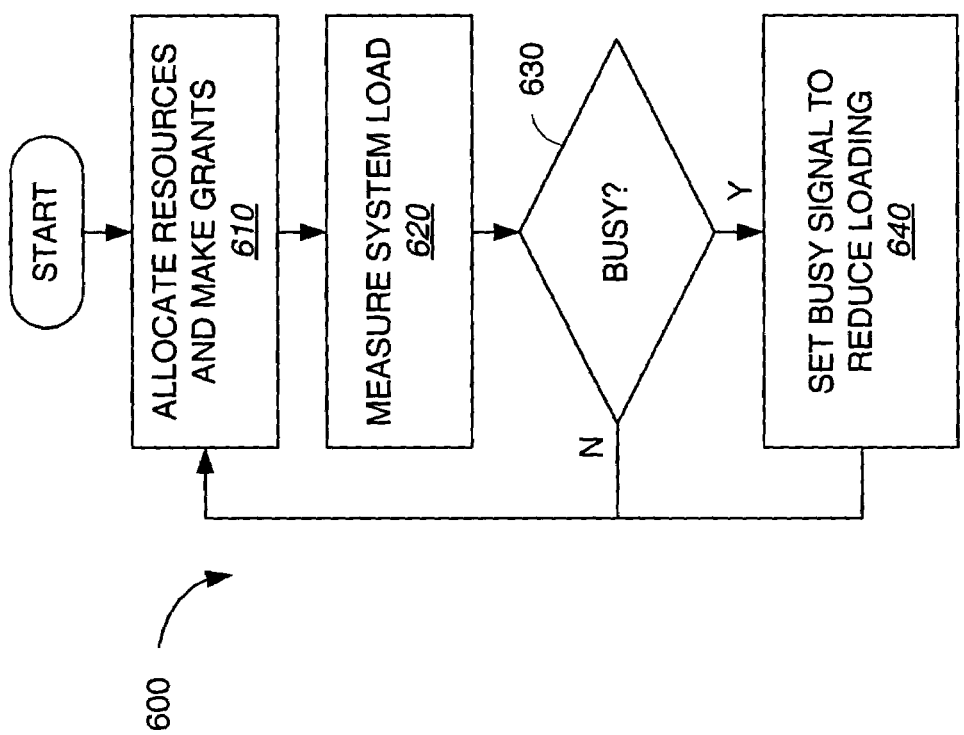
FIG. 6 depicts a method of congestion control that may be performed in a base station.

FIG. 6 depicts a method 600 of congestion control that may be performed in a base station. The process begins in step 610, where a serving base station, such as base station 104, allocates resources and makes grants, when applicable, to one or more mobile stations. The resources allocated may be a portion of a shared communication resource, as described above. The allocation may be computed using any requests for transmission received, as well as the expected amount of autonomous transmission, which may be based on statistical models, the number of mobile stations registered in the base station's coverage area, past autonomous transmission, etc. Individual and/or common grants may be allocated to one or more mobile stations, and the resultant messages may be transmitted to those mobile stations, as described above.

In step 620, the base station measures the system load. The loading on the system may be due to a previous allocation of resources, such as described with respect to step 610, as well as autonomous transmission. The system load may be more or less than anticipated when the previous allocation of resources was made. For example, the expected number of autonomous transmissions may be greater than or less than the amount of actual autonomous transmissions. Other factors, such as changes in channel conditions, a missed mobile station request (and subsequent transmission by that mobile station in response to a common grant), and other factors may cause the measured system loading to be higher or lower than is desired by the base station at a given time. One more source of variation is changes in the other cell interference that varies unpredictably. The base station often uses a margin to account for such unexpected behavior.

In decision block 630, based on the current measured conditions, if the base station decides that the system is exceeding the desired loading on the shared resource (The R-ESCH, in this example embodiment), proceed to step 640. Otherwise, return to step 610 to reallocate resources for the next time duration. If a previously asserted busy signal is asserted, it may be deasserted. In step 640, when the system is determined to be busy, a busy signal is asserted to indicate a need for reduced loading. The busy condition may be signaled to mobile stations in any of a variety of ways. In one embodiment, as described above, a busy bit is set on the F-OLCH. This channel is multiplexed onto the F-CPCCH. In another example, the F-OLCH could be multiplexed on another channel in a CDM on CDM manner, or be a separate physical channel, as described in the aforementioned 'AAA application. Mobile stations in the system may respond to an asserted busy signal in a variety of ways. Example embodiments are detailed further below.

Figure 7:
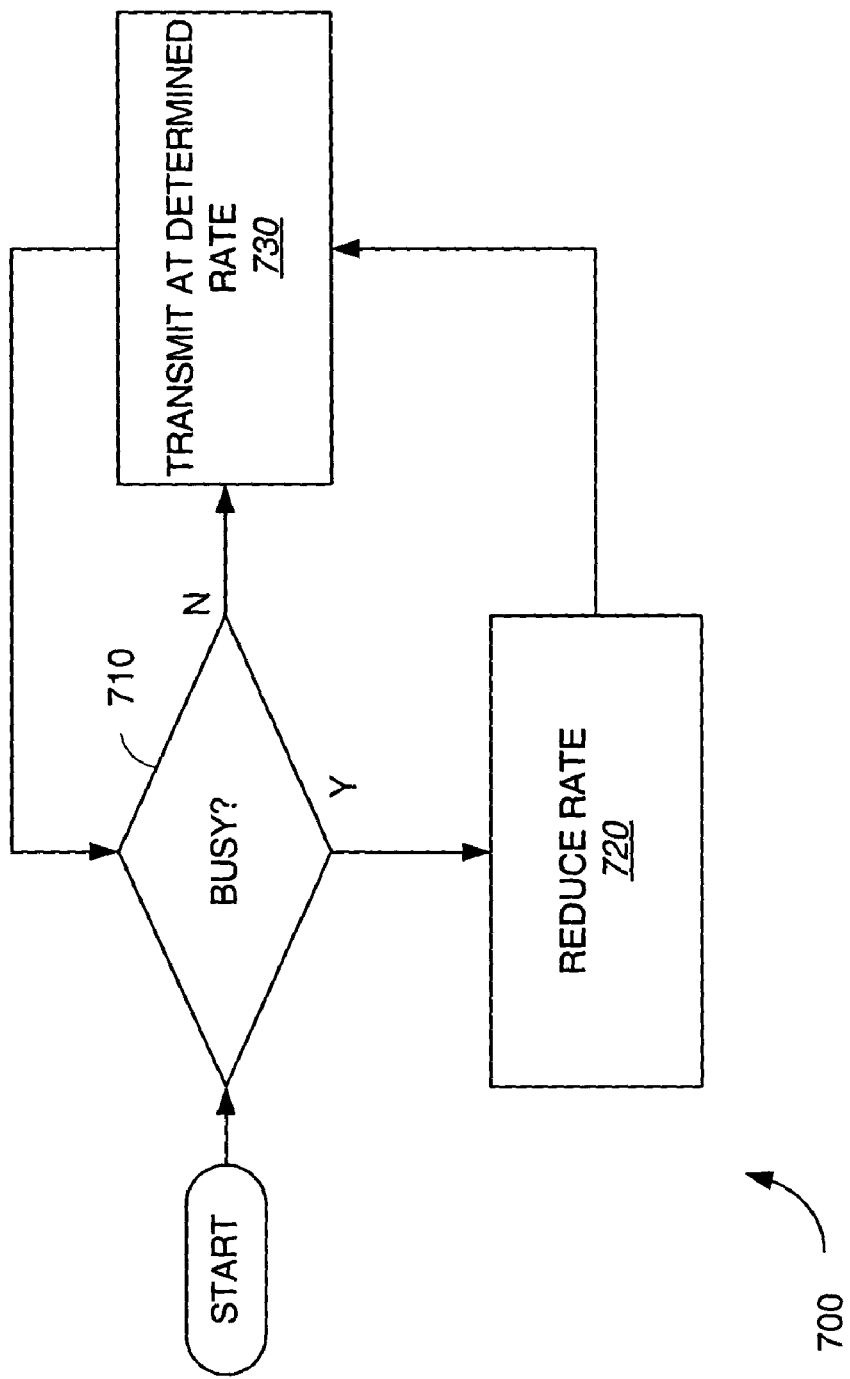
FIG. 7 depicts a generalized method of congestion control performed at a mobile station.

FIG. 7 depicts a generalized method 700 of congestion control performed at a mobile station. The process begins in decision block 710, if the system is identified as being busy, using any of the signaling techniques described above, such as a busy bit or busy signal, the mobile station proceeds to step 720 and reduces its rate (there may limitations as to when or how low to reduce the rate, examples are detailed below.) For example, mobile stations receiving the busy signal may reduce their rate all at once with a fixed rate reduction, using a probabilistic method to determine whether or not to reduce, using a probabilistic method to determine by how much to reduce the rate, and so forth. The rate reduction values may be pre-determined, or updated during a communication session using signaling. Different mobile stations may use different mechanisms to determine how to reduce their rates. For example, mobile stations with a higher QoS designation may be less likely to reduce, or reduce a lower amount, than a relatively lower QoS designated mobile station. Note that a mobile station transmitting under an individual or common grant may alter its transmission rate in response to a busy signal, as well as a mobile station transmitting autonomously. Any subclass of the mobile stations may be programmed to respond to a busy signal in a different way than any other subclass. For example, individual grants may not be designated for reduction, while a common grant is. Or both types may be designated for reduction, at different levels. QoS designations may determine the varying subclasses. Or, each mobile station may be signaled with its own unique parameters for responding to a busy signal with congestion control countermeasures. There are myriad combinations, some of which are described in example embodiments below, which will be readily apparent to those of skill in the art and fall within the scope of the present invention.

If the busy signal is not asserted, in decision block 710, proceed to step 730 and transmit at the determined rate. This rate may be determined in a variety of ways. The rate may be signaled using a common or individual grant, or may be the rate indicated as the maximum rate for autonomous transmission. Any of these example rates may have been reduced, as just described, in a previous iteration of method 700, and thus the determined rate reflects this reduction. A previously reduced rate may be increased once the busy signal is no longer asserted, either at a deterministic or probabilistic rate. Examples will be detailed below.

Note that, in general, the mechanisms for providing a common or individual grant may also be used for congestion control. For example, a common grant may be reissued at a lower rate. Or, an ACK (but not continue) command may be sent, followed by a lower individual grant to the respective mobile station. Similarly, an autonomous transmission maximum rate may be adjusted through signaling. These techniques require a relatively higher amount of overhead than setting a busy bit, with potentially longer latency in response. Thus, setting the busy bit allows the serving base station to work through a temporal increase in system load without the need to regrant. Nonetheless, selectively regranting (or removing previous grants, i.e. sending an ACK instead of an ACK-and-Continue), as described above, may be used in conjunction with the busy bit, as will be apparent to those of skill in the art.

Figure 8:
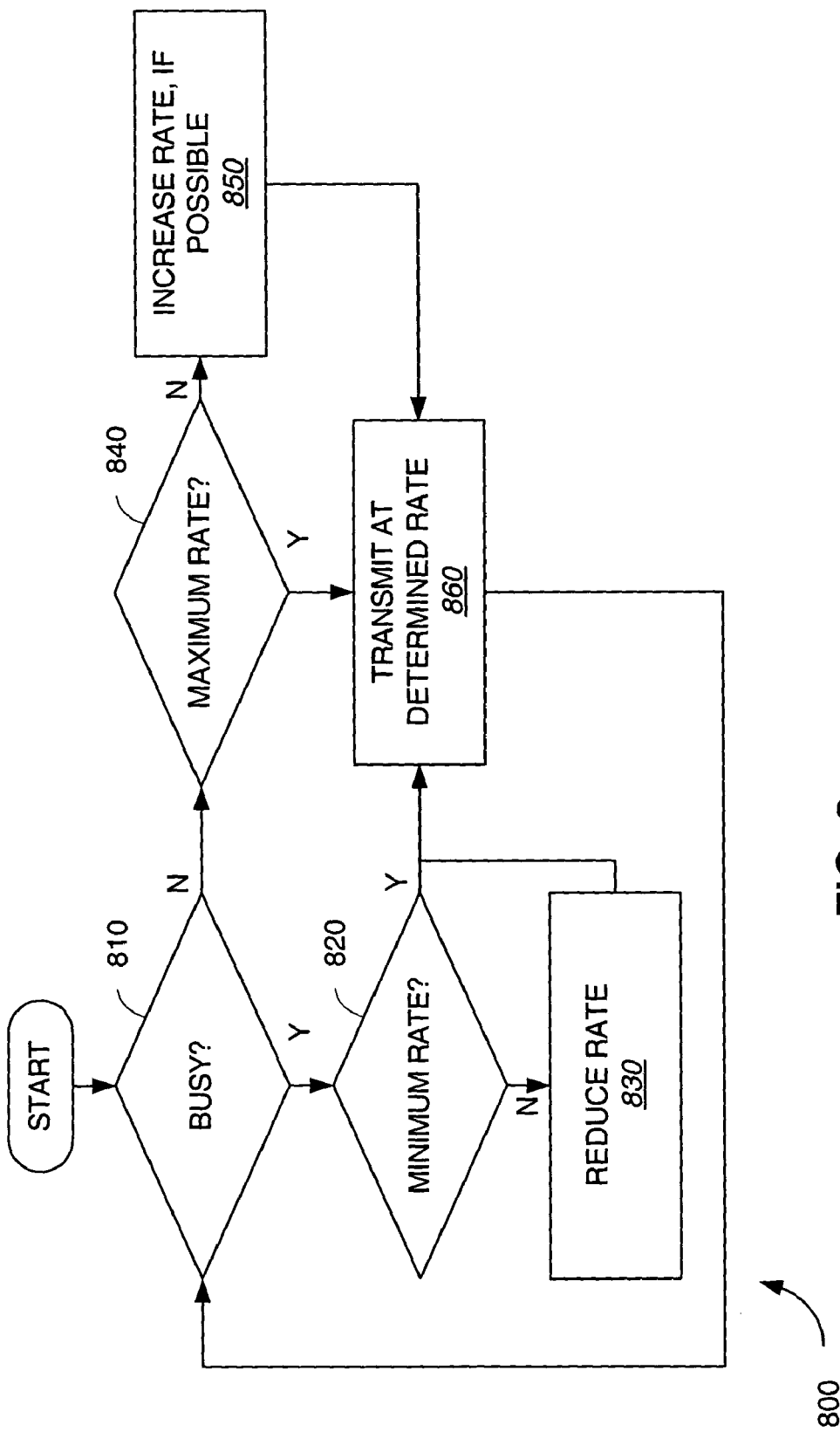
FIG. 8 depicts a method of congestion control with set rate limits.

FIG. 8 depicts a method 800 of congestion control with set rate limits. The process begins in decision block 810, where, if the busy signal is asserted, proceed to decision block 820. If the busy signal is not asserted, proceed to decision block 840. In decision block 840, if the mobile station is transmitting at the maximum allowed rate, proceed to step 860 to continue transmission at the current rate. The maximum allowed rate may be dependent upon the type of transmission being performed. The rate may be set as identified in an individual grant to the mobile station, a common grant on which the mobile station may rely, or may be the maximum allowed rate for autonomous transmission. If the current rate is less than the maximum allowed rate (due to a previous response to a busy condition, for example), proceed to step 850 to increase the rate. Then proceed to step 860 to transmit at the determined rate. An example technique for increasing and decreasing rates in accordance with rate limits is detailed further below with respect to FIG. 10.

In decision block 810, if the busy signal is asserted, proceed to decision block 820. If the mobile station is transmitting at the minimum specified rate, then proceed to step 860 to continue transmission at that rate. If not, proceed to step 830, reduce the rate, then proceed to step 860 and resume transmission at the adjusted rate. Note that the reduction or increase of rate in steps 830 or 850, respectively, may be deterministic or probabilistic.

In an alternate embodiment, details not shown, the mobile station may begin transmission at a rate other than the maximum specified. For example, a common grant may allow for a specified maximum rate. A mobile station may begin transmission at a lower rate, then increase its rate probabilistically or deterministically until the specified maximum rate is reached, as described in FIG. 8.

Figure 9:
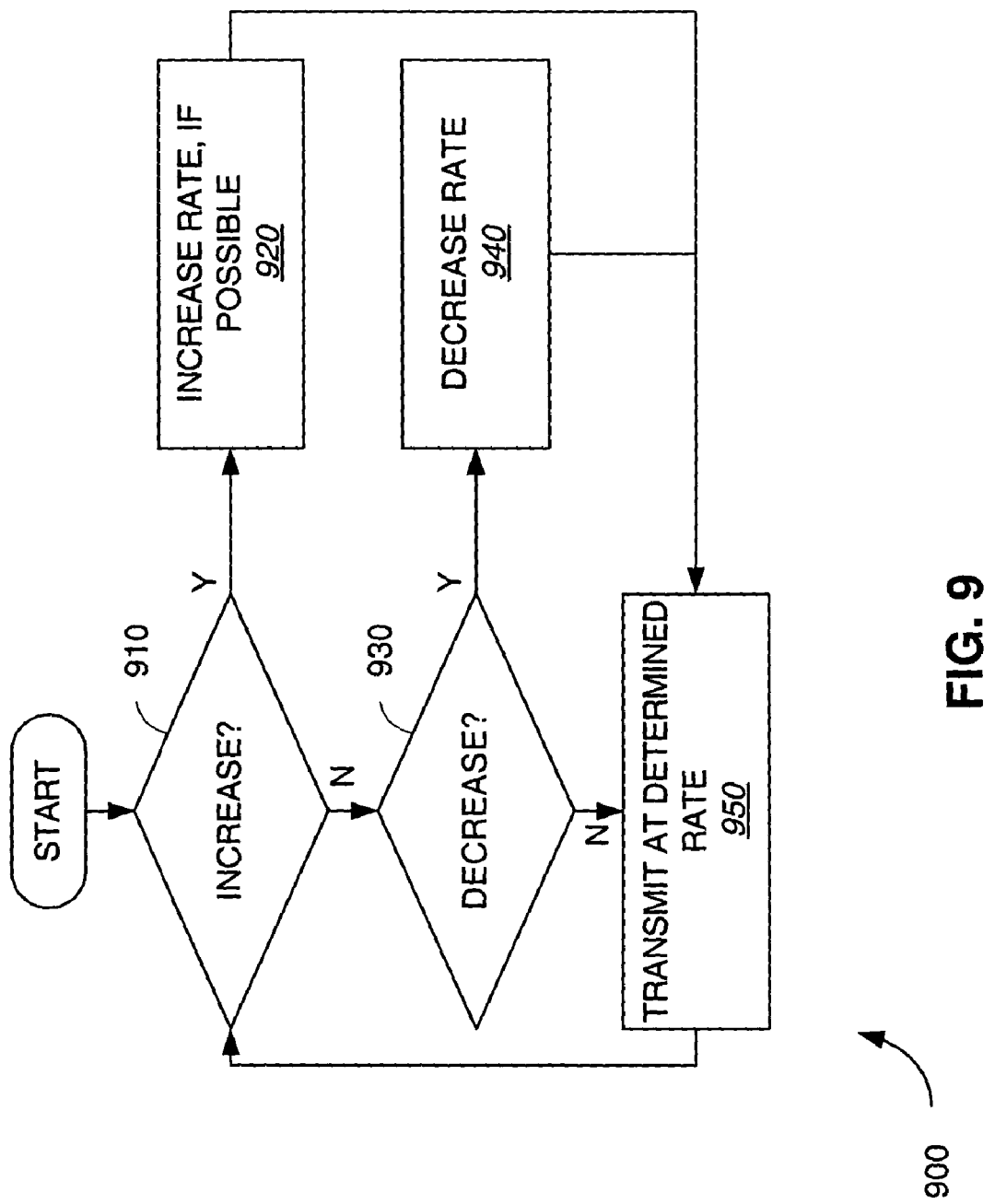
FIG. 9 depicts a method of congestion control using a tri-valued busy signal.

FIG. 9 depicts a method 900 of congestion control using a tri-valued busy signal. For example, a busy signal may contain one of three values, a first value to indicate the shared resource is underutilized, or that rates may increase, a second value to indicate the resource is overutilized, or that rates should decrease, and a third value to indicate that neither increases or decreases are desired. A tri-valued signal similar to the F-CACKCH may be deployed in one embodiment. An increase is signaled by transmitting a positive value, a decrease is signaled by transmitting a negative value, and no transmission indicates that neither an increase nor a decrease should be performed. Any other multi-valued signal may also be deployed, as will be apparent to those of skill in the art.

The process begins in decision block 910. If a mobile station receives an increase value on a busy signal, proceed to step 920 and increase the rate. The rate increase may be probabilistic or deterministic, and may include a maximum rate limit, as described above with respect to FIG. 8. Then the mobile station transmits at the determined rate in step 950. One example situation in which a rate increase may be signaled is following a previous rate decrease signaled on the busy signal in order to reduce congestion. When the congestion is relieved, it may be useful to reverse the effects of the rate decreases.

If a mobile station does not receive an increase value on the busy signal in decision block 910, proceed to decision block 930. If a decrease is received on the busy signal, proceed to step 940 and decrease the rate. The rate decrease may be probabilistic or deterministic, and may include a minimum rate limit, as described above with respect to FIG. 8. Then the mobile station transmits at the determined rate in step 950. A rate decrease signal may be used to reduce congestion on the shared resource.

If neither an increase nor decrease is received by the mobile station, then the current rate is used and the mobile station transmits at the determined rate in step 950. After transmission, the process returns to decision block 910 for the next iteration, in which a new value may be transmitted on the busy signal.

In an alternate embodiment, not shown, a multi-valued busy signal may be deployed using more than three values. Additional values may indicate varying levels of increase or decrease, and a mobile station may increase or decrease with a varying rate difference based on the respective signal received. For example, one value may indicate an increase to the maximum rate allowed, while another value indicates an intermediate incremental increase (which may ultimately be limited by the maximum rate). Similarly, a third value may indicate an incremental decrease, while a fourth value indicates the rate should immediately adjust to the minimum rate for the mobile station. A fifth value may indicate no adjustment is necessary. Myriad combinations of rate adjustment values on the busy signal will be readily deployed by those of skill in the art in light of the teachings herein.

Figure 10:
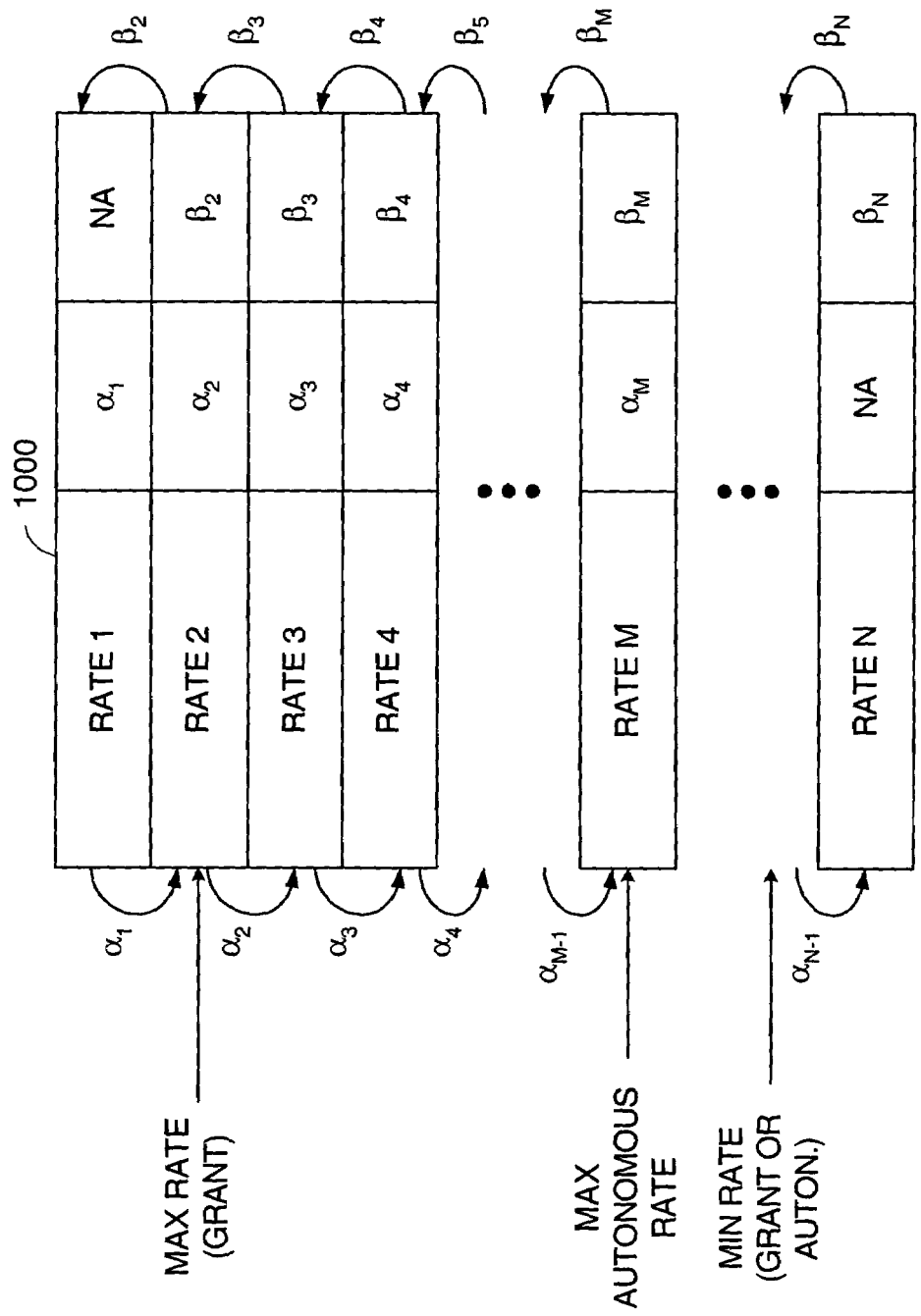
FIG. 10 depicts an embodiment of a rate table that may be deployed with any congestion control method.

FIG. 10 depicts an embodiment of a rate table 1000 that may be deployed with any congestion control method. In one embodiment, rate table 1000 may be deployed in memory 355, described above. In this example, rate table 1000 comprises N supported rates, where rate 1 is the highest supported rate and rate N is the lowest supported rate. Various parameters associated with the rates may also be stored. The rates and associated parameters may be adjusted through signaling, if necessary, or may be pre-determined and fixed. Rate tables in various mobile stations may be identical, but need not be so.

In the example of FIG. 10, rates have corresponding $\alpha$ and $\beta$ parameters for use in probabilistic rate increases and decreases, respectively. Transitions are shown from each rate (except the minimum rate) to a lower rate with an associated $\alpha$ value. Similarly, transitions are shown from each rate (except the maximum rate) to a higher rate with an associated $\beta$ value. When a busy signal indicates an increase or decrease, a mobile station will make a transition to a higher or lower rate with probability $\alpha$ or $\beta$, respectively. For example, when a mobile station transmitting at rate 3 receives a decrease signal, then it will lower its rate and transmit at rate 4 with probability $\alpha 3$. It will continue to transmit at rate 3, notwithstanding the decrease signal, with probability $1-\alpha 3$. Similarly, the mobile station transmitting at rate 3, after receiving an increase signal, will increase its transmission to rate 2 with probability $\beta 3$. Notwithstanding the increase signal, it will continue transmitting at rate 3 with probability $1-\beta 3$. A decrease parameter $\alpha$ is stored for each rate except the minimum rate, rate N. An increase parameter $\beta$ is stored for each rate except the maximum rate, rate 1. Note that each parameter does not need to have a unique value, and can be modified by signaling. In one example, a single probability parameter may be used for all increases and decreases from any rate to the higher or lower rate, respectively. Or, a single increase parameter may be used for all rates, and a different decrease parameter may be used for all rates. Any combination of increase and decrease parameters may be deployed. Those of skill in the art will recognize that the storage requirements of rate table 1000 may be adjusted in accordance with the number of unique parameters. The rate transition parameters may be used in conjunction with a busy signal to provide congestion control for a base station and any number of mobile stations, as described above.

Also depicted in FIG. 10 are various pointers indicating rate limits, for use in embodiments such as the examples described above. A maximum rate is specified. This rate may correspond to the rate given in a grant from the base station, which may be an individual grant or a common grant. The maximum rate may thus be adjusted through the course of requests and grants, as described above.

Also shown is the maximum autonomous rate. This rate may be adjusted through signaling. It may be the same for all mobile stations, or differing classes of mobile stations may have differing maximum autonomous rates based on QoS levels. A mobile station will know whether it is transmitting in response to a grant, either individual or common, or whether it is transmitting autonomously. The maximum rate for any given mobile station is thus dependent on the type of transmission being carried out.

A minimum rate may also be identified. This may be the minimum rate supported in the rate table 1000, or a higher rate may be specified. In one embodiment, the minimum supported rate may be used for autonomous transmission, while a higher minimum rate is used for transmission in response to a grant. Thus, the mobile station may limit its rate decreases in response to a busy signal to differing levels based on the type of transmission being carried out. Recall that, as described above, a mobile station may be deployed to respond to the busy signal for any transmission (autonomous or granted), or a subset of the possible transmission types. For example, individual grants may be exempted from congestion control, and the mobile station may perform rate adjustment in response to the busy signal for common grant transmissions or autonomous transmissions. The common grant transmission rates may thus be limited, for example, to those rates between the maximum rate and the minimum rate. The autonomous transmission rates may be limited to those rates between the minimum supported rate (rate N) and the maximum autonomous rate (rate M, in this example). The rate adjustment may be performed using any congestion control method, examples of which are described above with respect to FIGS. 6-9.

It should be noted that in all the embodiments described above, method steps can be interchanged without departing from the scope of the invention. The descriptions disclosed herein have in many cases referred to signals, parameters, and procedures associated with the 1xEV-DV standard, but the scope of the present invention is not limited as such. Those of skill in the art will readily apply the principles herein to various other communication systems. These and other modifications will be apparent to those of ordinary skill in the art.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, comprising:
a receiver for receiving a plurality of access requests for transmission on a shared resource from a respective plurality of remote stations and for measuring the utilization of the shared resource;
a scheduler for allocating a portion of the shared resource to zero or more of the requesting remote stations in response to the plurality of access requests, the allocation comprising zero or one common access grant to a subset of the requesting remote stations and for generating a busy command based at least in part on the measured utilization by other remote stations of the shared resource; and
a transmitter for transmitting the common access grant to the remaining remote stations on one or more common grant channels and for transmitting a busy signal comprising one or more busy commands.

2. An apparatus, comprising:
a receiver for receiving a plurality of access requests for transmission on a shared resource from a respective plurality of remote stations and for measuring the utilization of the shared resource;
a scheduler for allocating a portion of the shared resource to zero or more of the requesting remote stations in response to the plurality of access requests, the allocation comprising zero or one common access grant to a subset of the requesting remote stations and for generating a busy command in response to the measured utilization; and
a transmitter for transmitting the common access grant to the remaining remote stations on one or more common grant channels and for transmitting a busy signal comprising one or more busy commands;
the apparatus being further configured to operate with the plurality of remote stations equipped to transmit autonomously on the shared resource, using a limited portion of the shared resource, without an access request or access grant, and wherein:
the scheduler computes the expected amount of the shared resource to be consumed by the autonomous transmissions and allocates the portion of the shared resource for individual and common access grants in response thereto.

3. An apparatus, comprising:
a receiver for receiving a plurality of access requests for transmission on a shared resource from a respective plurality of remote stations and for measuring the utilization of the shared resource;

a scheduler for allocating a portion of the shared resource to zero or more of the requesting remote stations in response to the plurality of access requests, the allocation comprising zero or one common access grant to a subset of the requesting remote stations and for generating a busy command in response to the measured utilization; and a transmitter for transmitting the common access grant to the remaining remote stations on one or more common grant channels and for transmitting a busy signal comprising one or more busy commands;

the apparatus being further configured to operate with one or more remote stations transmitting with permission from one or more access grants, the apparatus further comprising:

a decoder for decoding one or more received packets and determining if the one or more received packets decoded without error; and wherein:
the receiver further receives the one or more packets of data from one or more remote stations, respectively;

the transmitter further transmits to the one or more remote stations an acknowledgment and grant extension (ACK-and-Continue) command, respectively, when the respective received packet decoded without error and the access grant for the respective remote station is to be extended; and the scheduler determines the allocation of the portion of the shared resource in accordance with individual and common grants extended with the one or more ACK-and-Continue commands.

4. A remote station, comprising:

a data buffer for receiving data for transmission;

a message generator for generating an access request message when the data buffer contains data for transmission;

a receiver for receiving one or more common grant channels from a base station and for receiving a busy signal based at least in part on a measured utilization by other remote stations of a shared resource from the base station;

a message decoder for decoding an access grant directed to the remote station, the access grant comprising a common grant on one of the one or more common grant channels; and a transmitter for transmitting the access request message and for transmitting a portion of data from the data buffer in response to a decoded access grant in accordance with the received busy signal, wherein:

the receiver further receives one or more individual grant channels from the base station; and the message decoder further decodes an access grant comprising an individual grant directed on one of the one or more individual grant channels.

5. A remote station, comprising:

a data buffer for receiving data for transmission;

a message generator for generating an access request message when the data buffer contains data for transmission;

a receiver for receiving one or more common grant channels from a base station and for receiving a busy signal based at least in part on a measured utilization by other remote stations of a shared resource from the base station;

a message decoder for decoding an access grant directed to the remote station, the access grant comprising a common grant on one of the one or more common grant channels; and a transmitter for transmitting the access request message and for transmitting a portion of data from the data buffer in response to a decoded access grant in accordance with the received busy signal, wherein the transmitter further transmits a limited portion of the data in the data buffer autonomously, irrespective of whether an access grant has been received, responsive to the received busy signal.

6. A remote station, comprising:

a data buffer for receiving data for transmission;

a message generator for generating an access request message when the data buffer contains data for transmission;

a receiver for receiving one or more common grant channels from a base station and for receiving a busy signal from the base station;

a message decoder for decoding an access grant directed to the remote station, the access grant comprising a common grant on one of the one or more common grant channels; and a transmitter for transmitting the access request message and for transmitting a portion of data from the data buffer in response to a decoded access grant in accordance with the received busy signal, wherein:

the receiver further receives an ACK-and-Continue command; and the transmitter transmits an additional portion of data from the data buffer in response to a previously decoded access grant, responsive to the received busy signal.

7. A remote station, comprising:

a data buffer for receiving data for transmission;

a message generator for generating an access request message when the data buffer contains data for transmission;

a receiver for receiving one or more common grant channels from a base station and for receiving a busy signal from the base station;

a message decoder for decoding an access grant directed to the remote station, the access grant comprising a common grant on one of the one or more common grant channels; and a transmitter for transmitting the access request message and for transmitting a portion of data from the data buffer in response to a decoded access grant in accordance with the received busy signal, wherein the transmitter further transmits a limited portion of the data in the data buffer autonomously, subsequent to a received ACK, responsive to the received busy signal.

8. A remote station, comprising:

a data buffer for receiving data for transmission;

a message generator for generating an access request message when the data buffer contains data for transmission;

a receiver for receiving one or more common grant channels from a base station and for receiving a busy signal from the base station;

a message decoder for decoding an access grant directed to the remote station, the access grant comprising a common grant on one of the one or more common grant channels; and a transmitter for transmitting the access request message and for transmitting a portion of data from the data buffer in response to a decoded access grant in accordance with the received busy signal, wherein:

the receiver further receives a NAK command; and the transmitter retransmits the portion of data from the data buffer previously transmitted in response to a previously decoded access grant, responsive to the received busy signal.

9. A remote station, comprising:
a data buffer for receiving data for transmission;
a message generator for generating an access request message when the data buffer contains data for transmission;
a receiver for receiving one or more common grant channels from a base station and for receiving a busy signal based at least in part on a measured utilization by other remote stations of a shared resource from the base station;
a message decoder for decoding an access grant directed to the remote station, the access grant comprising a common grant on one of the one or more common grant channels; and
a transmitter for transmitting the access request message and for transmitting a portion of data from the data buffer in response to a decoded access grant in accordance with the received busy signal, wherein the transmission rate is decreased in response to an assertion on the received busy signal.

10. The remote station of claim 9, wherein the decrease is deterministic.

11. The remote station of claim 9, wherein the decrease is probabilistic.

12. A remote station, comprising:
a data buffer for receiving data for transmission;
a message generator for generating an access request message when the data buffer contains data for transmission;
a receiver for receiving one or more common grant channels from a base station and for receiving a busy signal based at least in part on a measured utilization by other remote stations of a shared resource from the base station;
a message decoder for decoding an access grant directed to the remote station, the access grant comprising a common grant on one of the one or more common grant channels; and
a transmitter for transmitting the access request message and for transmitting a portion of data from the data buffer in response to a decoded access grant in accordance with the received busy signal, wherein the transmission rate is increased in response to an assertion on the received busy signal.

13. The remote station of claim 12, wherein the increase is deterministic.

14. The remote station of claim 12, wherein the increase is probabilistic.

15. A remote station, comprising:
a data buffer for receiving data for transmission;
a message generator for generating an access request message when the data buffer contains data for transmission;
a receiver for receiving one or more common grant channels from a base station and for receiving a busy signal based at least in part on a measured utilization by other remote stations of a shared resource from the base station;
a message decoder for decoding an access grant directed to the remote station, the access grant comprising a common grant on one of the one or more common grant channels; and
a transmitter for transmitting the access request message and for transmitting a portion of data from the data buffer in response to a decoded access grant in accordance with the received busy signal, wherein the transmission rate is increased or decreased in response to the received busy signal, the amount of increase or decrease conditioned on a Quality of Service (QoS) service level.

16. A wireless communication system, comprising:
a plurality of remote stations, each of a subset of which transmit an access request message to form a plurality of access request messages;
a base station for:
receiving the plurality of access request messages;
measuring the utilization of the shared resource;
allocating a shared system resource among the plurality of remote stations;
transmitting zero or more individual access grants to a subset of the requesting remote stations and zero or more common access grants to the remaining requesting remote stations; and
transmitting a busy signal when the measured utilization exceeds a predetermined threshold.

17. The wireless communication system of claim 16, wherein the requesting remote stations receive the transmitted individual or common access grants and the busy signal and transmit data to the base station respectively in accordance therewith, responsive to the received busy signal.

18. The wireless communication system of claim 16, wherein a subset of the plurality of remote stations transmit data autonomously, responsive to the transmitted busy signal.

19. A method of access control of a shared resource, comprising:
receiving a plurality of access requests for transmission on the shared resource from a respective plurality of remote stations;
allocating a portion of the shared resource to zero or more of the requesting remote stations in response to the plurality of access requests, the allocation comprising zero or one common access grant to a subset of the requesting remote stations;
transmitting the common access grant to the remaining remote stations on one or more common grant channels;
measuring the utilization of the shared resource; and
transmitting a busy signal when the measured utilization exceeds a predetermined threshold.

20. The method of claim 19, wherein:
the allocation further comprises zero or more individual access grants to zero or more requesting remote stations; and
further comprising transmitting the individual access grants to the respective remote stations on one or more individual grant channels.

21. The method of claim 19, operable with the plurality of remote stations equipped to transmit autonomously on the shared resource, using a limited portion of the shared resource, without an access request or access grant, further comprising:
computing the expected amount of the shared resource to be consumed by the autonomous transmissions and allocating the portion of the shared resource for individual and common access grants in response thereto.

22. The method of claim 19, operable with one or more remote stations transmitting with permission from one or more access grants, further comprising:
decoding one or more received packets;
determining if the one or more received packets decoded without error;
transmitting to the one or more remote stations an acknowledgment and grant extension (ACK-and-Continue) command, respectively, when the respective received packet decoded without error and the access grant for the respective remote station is to be extended; and wherein the allocation of the portion of the shared resource is performed in accordance with individual and common grants extended with the one or more ACK-and-Continue commands.

23. The method of claim 19, wherein the busy signal comprises a series of commands, each command one of a first value indicating a decrease or a second value indicating an increase.

24. The method of claim 23, wherein the series of commands further comprise a third value indicating neither an increase or decrease.

25. The method of claim 19, wherein the busy signal comprises a series of commands, each command one of one or more values indicating respective one or more decreases, the respective decreases indicating different decrease amounts or one or more values indicating respective one or more increases, the respective increases indicating different increase amounts.

26. The method of claim 25, wherein the series of commands further comprise a value indicating neither an increase or decrease.

27. A method of transmission, comprising:
receiving data for transmission;
storing the data in a data buffer;
generating an access request message;
transmitting the access request message;
receiving one or more common grant channels from a base station;
decoding an access grant comprising a common grant on one of the one or more common grant channels;
receiving a busy signal from the base station; and
transmitting a portion of data from the data buffer in response to a decoded access grant adapted in accordance with the received busy signal, further comprising:
receiving one or more individual grant channels; and
wherein the access grant alternately comprises an individual grant directed on one of the one or more individual grant channels.

28. A method of transmission, comprising:
receiving data for transmission;
storing the data in a data buffer;
generating an access request message;
transmitting the access request message;
receiving one or more common grant channels from a base station;
decoding an access grant comprising a common grant on one of the one or more common grant channels;
receiving a busy signal from the base station; and
transmitting a portion of data from the data buffer in response to a decoded access grant adapted in accordance with the received busy signal, further comprising transmitting a limited portion of the data in the data buffer autonomously, irrespective of whether an access grant has been received, responsive to the received busy signal.

29. A method of transmission, comprising:
receiving data for transmission;
storing the data in a data buffer;
generating an access request message;
transmitting the access request message;
receiving one or more common grant channels from a base station;
decoding an access grant comprising a common grant on one of the one or more common grant channels;
receiving a busy signal from the base station; and transmitting a portion of data from the data buffer in response to a decoded access grant adapted in accordance with the received busy signal, further comprising:
receiving an ACK-and-Continue command; and
transmitting an additional portion of data from the data buffer in response to a previously decoded access grant adapted to the received busy signal.

30. A method of transmission, comprising:
receiving data for transmission;
storing the data in a data buffer;
generating an access request message;
transmitting the access request message;
receiving one or more common grant channels from a base station;
decoding an access grant comprising a common grant on one of the one or more common grant channels;
receiving a busy signal from the base station; and
transmitting a portion of data from the data buffer in response to a decoded access grant adapted in accordance with the received busy signal, further comprising transmitting a limited portion of the data in the data buffer autonomously, subsequent to a received ACK, responsive to the received busy signal.

31. A method of transmission, comprising:
receiving data for transmission;
storing the data in a data buffer;
generating an access request message;
transmitting the access request message;
receiving one or more common grant channels from a base station;
decoding an access grant comprising a common grant on one of the one or more common grant channels;
receiving a busy signal from the base station; and
transmitting a portion of data from the data buffer in response to a decoded access grant adapted in accordance with the received busy signal, further comprising:
receiving a NAK command; and
retransmitting the portion of data from the data buffer previously transmitted in response to a previously decoded access grant, responsive to the received busy signal.

32. A method of transmission, comprising:
receiving data for transmission;
storing the data in a data buffer;
generating an access request message;
transmitting the access request message;
receiving one or more common grant channels from a base station;
decoding an access grant comprising a common grant on one of the one or more common grant channels;
receiving a busy signal from the base station, wherein the busy signal is based at least in part on a measured utilization by other remote stations of a shared resource; and
transmitting a portion of data from the data buffer in response to a decoded access grant adapted in accordance with the received busy signal, wherein the transmission rate is decreased in response to an assertion on the received busy signal.

33. The method of claim 32, wherein the decrease is deterministic.

34. The method of claim 32, wherein the decrease is probabilistic.

35. A method of transmission, comprising:
receiving data for transmission;
storing the data in a data buffer;
generating an access request message;
transmitting the access request message;

receiving one or more common grant channels from a base station;

decoding an access grant comprising a common grant on one of the one or more common grant channels;

receiving a busy signal from the base station, wherein the busy signal is based at least in part on a measured utilization by other remote stations of a shared resource; and transmitting a portion of data from the data buffer in response to a decoded access grant adapted in accordance with the received busy signal, wherein the transmission rate is increased in response to an assertion on the received busy signal.

36. The method of claim 35, wherein the increase is deterministic.

37. The method of claim 35, wherein the increase is probabilistic.

38. A method of transmission, comprising:
receiving data for transmission;
storing the data in a data buffer;
generating an access request message;
transmitting the access request message;
receiving one or more common grant channels from a base station;
decoding an access grant comprising a common grant on one of the one or more common grant channels;
receiving a busy signal from the base station, wherein the busy signal is based at least in part on a measured utilization by other remote stations of a shared resource; and
transmitting a portion of data from the data buffer in response to a decoded access grant adapted in accordance with the received busy signal, wherein the transmission rate is increased or decreased in response to the received busy signal, the amount of increase or decrease conditioned on a Quality of Service (QoS) service level.

39. An apparatus, comprising:
means for receiving a plurality of access requests for transmission on the shared resource from a respective plurality of remote stations;
means for allocating a portion of the shared resource to zero or more of the requesting remote stations in response to the plurality of access requests, the allocation comprising zero or one common access grant to a subset of the requesting remote stations;
means for transmitting the common access grant to the remaining remote stations on one or more common grant channels;
means for measuring the utilization of the shared resource; and
means for transmitting a busy signal when the measured utilization exceeds a predetermined threshold.

40. A wireless communication system, comprising:
means for receiving a plurality of access requests for transmission on the shared resource from a respective plurality of remote stations;
means for allocating a portion of the shared resource to zero or more of the requesting remote stations in response to the plurality of access requests, the allocation comprising zero or one common access grant to a subset of the requesting remote stations;
means for transmitting the common access grant to the remaining remote stations on one or more common grant channels;
means for measuring the utilization of the shared resource; and
means for transmitting a busy signal when the measured utilization exceeds a predetermined threshold.

41. An apparatus, operable with a plurality of remote stations capable of transmission on a shared resource, comprising:
a receiver for receiving a plurality of access requests for transmission on the shared resource from a respective plurality of remote stations and for measuring the utilization of the shared resource;
a scheduler for allocating a portion of the shared resource to zero or more of the requesting remote stations in response to the plurality of access requests, the allocation comprising zero or one common access grant to a subset of the requesting remote stations and for generating a busy command when the measured utilization exceeds a predetermined threshold; and
a transmitter for transmitting the common access grant to the remaining remote stations on one or more common grant channels and for transmitting a busy signal comprising one or more busy commands.

42. The apparatus of claim 41, wherein:
the scheduler further allocates with an allocation further comprising zero or more individual access grants to zero or more requesting remote stations; and
the transmitter further transmits the individual access grants to the respective remote stations on one or more individual grant channels.

43. The apparatus of claim 41, wherein each busy command comprises one of a first value indicating a decrease or a second value indicating an increase.

44. The apparatus of claim 43, wherein each busy command alternately further comprises a third value indicating neither an increase or decrease.

45. The apparatus of claim 41, wherein each busy command comprises one of one or more values indicating respective one or more decreases, the respective decreases indicating different decrease amounts or one or more values indicating respective one or more increases, the respective increases indicating different increase amounts.

46. The apparatus of claim 45, wherein each busy command alternately further comprises a value indicating neither an increase or decrease.

47. The apparatus of claim 41, further operable with the plurality of remote stations equipped to transmit autonomously on the shared resource, using a limited portion of the shared resource, without an access request or access grant, and wherein:
the scheduler computes the expected amount of the shared resource to be consumed by the autonomous transmissions and allocates the portion of the shared resource for individual and common access grants in response thereto.

48. The apparatus of claim 41, further operable with one or more remote stations transmitting with permission from one or more access grants, the apparatus further comprising:
a decoder for decoding one or more received packets and determining if the one or more received packets decoded without error; and
wherein:
the receiver further receives the one or more packets of data from one or more remote stations, respectively;
the transmitter further transmits to the one or more remote stations an acknowledgment and grant extension (ACK-and-Continue) command, respectively, when the respective received packet decoded without error and the access grant for the respective remote station is to be extended; and the scheduler determines the allocation of the portion of the shared resource in accordance with individual and common grants extended with the one or more ACK-and-Continue commands.

49. A remote station, comprising:

a data buffer for receiving data for transmission;

a message generator for generating an access request message when the data buffer contains data for transmission;

a receiver for receiving one or more common grant channels from a base station and for receiving a busy signal based at least in part on a measured utilization by other remote stations of a shared resource from the base station;

a message decoder for decoding an access grant directed to the remote station, the access grant comprising a common grant on one of the one or more common grant channels; and a transmitter for transmitting the access request message and for transmitting a portion of data received busy signal.

50. A method of transmission, comprising:

receiving data for transmission;

storing the data in a data buffer;

generating an access request message;

transmitting the access request message;

receiving one or more common grant channels from a base station;

decoding an access grant comprising a common grant on one of the one or more common grant channels;

receiving a busy signal based at least in part on a measured utilization by other remote stations of a shared resource from the base station; and transmitting a portion of data from the data buffer in response to a decoded access grant adapted in accordance with the received busy signal.

51. An apparatus, comprising:

means for receiving data for transmission;

means for storing the data in a data buffer;

means for generating an access request message;

means for transmitting the access request message;

means for receiving one or more common grant channels from a base station;

means for decoding an access grant comprising a common grant on one of the one or more common grant channels;

means for receiving a busy signal based at least in part on a measured utilization by other remote stations of a shared resource from the base station; and means for transmitting a portion of data from the data buffer in response to a decoded access grant adapted in accordance with the received busy signal.

52. A wireless communication system, comprising:

means for receiving data for transmission;

means for storing the data in a data buffer;

means for generating an access request message;

means for transmitting the access request message;

means for receiving one or more common grant channels from a base station;

means for decoding an access grant comprising a common grant on one of the one or more common grant channels;

means for receiving a busy signal based at least in part on a measured utilization by other remote stations of a shared resource from the base station; and means for transmitting a portion of data from the data buffer in response to a decoded access grant adapted in accordance with the received busy signal.

* * * * *

UNITED STATES PATENT AND TRADEMARK OFFICE
CERTIFICATE OF CORRECTION

PATENT NO. : 7,660,282 B2
APPLICATION NO. : 10/646242
DATED : February 9, 2010
INVENTOR(S) : Sandip Sarkar It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 638 days.

Signed and Sealed this

Fourth Day of January, 2011

David J. Kappos
*Director of the United States Patent and Trademark Office*